US007467028B2

(12) United States Patent
Pilgrim et al.

(10) Patent No.: US 7,467,028 B2
(45) Date of Patent: Dec. 16, 2008

(54) SYSTEM AND METHOD FOR TRANSFERRING INFORMATION TO A MOTOR VEHICLE

(75) Inventors: Michael Pilgrim, Dublin, OH (US); John Vilkinofsky, Dublin, OH (US); Nathaniel W. Diedrich, Dublin, OH (US); Andrew T. Goeppner, Plain City, OH (US); Ross C. Miller, Hilliard, OH (US); Jason A. Dutter, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 779 days.

(21) Appl. No.: 10/867,218

(22) Filed: Jun. 15, 2004

(65) Prior Publication Data
US 2005/0278080 A1 Dec. 15, 2005

(51) Int. Cl.
*G06F 17/30* (2006.01)
*H04B 7/00* (2006.01)
(52) U.S. Cl. ............................. 701/1; 701/36; 707/102
(58) Field of Classification Search .................. None
See application file for complete search history.

(56) References Cited

U.S. PATENT DOCUMENTS

| | | | | |
|---|---|---|---|---|
| 5,742,893 | A * | 4/1998 | Frank | 455/66.1 |
| 6,118,450 | A | 9/2000 | Proehl et al. | |
| 6,248,946 | B1 | 6/2001 | Dwek | |
| 6,370,449 | B1 * | 4/2002 | Razavi et al. | 701/1 |
| 6,374,177 | B1 * | 4/2002 | Lee et al. | 701/200 |
| 6,526,335 | B1 * | 2/2003 | Treyz et al. | 701/1 |
| 6,779,196 | B1 | 8/2004 | Igbinadolor | |
| 6,842,761 | B2 | 1/2005 | Diamond et al. | |
| 6,973,476 | B1 * | 12/2005 | Naden et al. | 709/203 |
| 7,000,188 | B1 | 2/2006 | Eustace | |
| 7,232,948 | B2 * | 6/2007 | Zhang | 84/600 |
| 2002/0164973 | A1 * | 11/2002 | Janik et al. | 455/403 |
| 2003/0053433 | A1 * | 3/2003 | Chun | 370/338 |
| 2003/0110057 | A1 * | 6/2003 | Pisz | 705/1 |
| 2004/0002310 | A1 * | 1/2004 | Herley et al. | 455/179.1 |
| 2004/0107271 | A1 * | 6/2004 | Ahn et al. | 709/219 |
| 2004/0117851 | A1 | 6/2004 | Karagouz et al. | |
| 2004/0171377 | A1 | 9/2004 | Engstrom | |
| 2004/0187011 | A1 * | 9/2004 | Lee et al. | 713/193 |
| 2005/0187668 | A1 * | 8/2005 | Baumgarte | 701/1 |
| 2005/0262146 | A1 * | 11/2005 | Grace et al. | 707/104.1 |

FOREIGN PATENT DOCUMENTS

WO WO 00/72463 A2 * 11/2000

OTHER PUBLICATIONS

PCWORLD; Martyn Williams; Transfer Tunes From Your PC to Your Car; IDG News Service; Jan. 9, 2003.*
Mobile Magazine; Fabrizio Pilato; Omnifi Mobile Audio Player Connects WiFi to Your Car; Nov. 3, 2003.*

* cited by examiner

*Primary Examiner*—Michael J. Zanelli
(74) *Attorney, Agent, or Firm*—Plumsea Law Group, LLC; Mark E. Duell

(57) ABSTRACT

A system and method for transferring information to a motor vehicle is disclosed. The system and method can send music files from a computer to an on board unit associated with a motor vehicle. The music files can be sent in a variety of different ways, including wirelessly. In some cases, the on board music collection can also be remotely managed from a computer in wireless communication with the on board unit.

16 Claims, 16 Drawing Sheets

SYSTEM AND METHOD FOR TRANSFERRING INFORMATION TO A MOTOR VEHICLE

BACKGROUND OF THE INVENTION

1. Field of the Invention

This invention relates to the field of communications, and more particularly, to a system and method for transferring information to a motor vehicle.

2. Related Art

Currently, most cars, trucks and vans provide some kind of audio system. These audio systems range from simple systems that include a radio tuner and a basic loudspeaker, to elaborate systems that include sophisticated audio and video electronics. Some of these elaborate systems are capable of playing audio Compact Disks (CD's), Digital Versatile Disks (DVD's) and MiniDiscs.

Single disk systems generally provide a loading slot or some other mechanism that is accessible to the driver to receive a disk. Single disk systems require users to manually change disks to listen to different songs.

These systems can also include disk changers that store multiple disks. Generally, these disks and the songs stored on the disks can be accessed randomly. Disk changer systems provide access to about six to ten CD's; however, a delay is experienced when changing from one disk to another disk. The only way to add songs or change the collection of music that is available in the motor vehicle, is to add another disk to the changer or replace a disk in the changer with a new disk.

Some mobile audio systems include a hard disk drive that is used to store songs. These systems generally include a removable hard disk drive that mates with a docking device in the motor vehicle. To add songs or otherwise update the music collection stored on the hard disk drive, the hard disk drive must be removed from the motor vehicle and docked into a second docking device connected to a home computer. The home computer is used to add songs and to modify the contents of the removable hard disk drive. After all of the changes have been made, the hard disk drive is removed from the docking device connected to the home computer, and re-inserted into the docking device in the motor vehicle.

While current audio systems can provide access to music collections, there are a number of drawbacks and limitations. First, single disk systems and disk changer systems are limited in terms of the amount of music that is available. Single disk systems provide access to only a single disk before requiring a manual disk change. Disk changer systems provide access to at most about ten CD's of music and also require the manual removal, replacement or addition of disks to update the available music collection.

Hard disk drive based systems provide access to larger music collections, but these systems also require manual intervention to add or modify the available music collection. As discussed above, the hard disk drive must be removed, docked with a home computer, removed from the home computer docking device and re-docked inside the motor vehicle. While these systems are capable of being updated, the process is cumbersome and inconvenient.

There is currently a need for a system that provides access to a large music collection and is easy to update and modify. There is also a need for a system that can remotely manage an on board music collection.

SUMMARY OF THE INVENTION

A system and method for managing an on board music collection is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention includes a motor vehicle comprising: a central unit including: a display configured to display information and configured to be visible within a portion of the passenger compartment, an input device, a storage device, and a wireless antenna port configured to communicate with a wireless antenna; where the wireless antenna is configured to communicate with a wireless network; and where the central unit receives a music file from the wireless antenna port and wherein the central unit stores the music file on the storage device.

In another aspect, the wireless antenna is configured to communicate with a broadband wireless access network.

In another aspect, the central unit can receive an instruction through the wireless antenna.

In another aspect, the central unit includes provisions to communicate with a second wireless network.

In another aspect, the provisions include a second wireless antenna port in communication with a second wireless antenna, wherein the second wireless antenna is configured to communicate with the second wireless network.

In another aspect, the provisions include a local wireless antenna port in communication with a local wireless antenna, wherein the local wireless antenna is configured to communicate with a wireless telephone.

In another aspect, the music file is a compressed file.

In another aspect, the music file is an uncompressed file.

In another aspect, the invention provides a method for sending a music file from a computer to an on-board unit (OBU) associated with a motor vehicle comprising the steps of: receiving a first identifier corresponding to OBU identifying information associated with the OBU, the first identifier including information uniquely associated with the OBU; comparing the first identifier with a second identifier; and permitting access to the OBU if the first identifier is substantially similar to the second identifier.

In another aspect, access to the OBU is denied if the first identifier is different than the second identifier.

In another aspect, the first identifier is related to a Vehicle Identification Number associated with the motor vehicle.

In another aspect, the second identifier is received from a user.

In another aspect, the method is executed by an application running on a computer.

In another aspect, the application is stored on a disk provided to a user and the second identifier is also stored on the disk.

In another aspect, the second identifier is retrieved from a memory associated with a computer.

In another aspect, a second opportunity to enter the second identifier is provided if a first attempt to enter the second identifier was unsuccessful.

In another aspect, the invention provides a system for managing music files stored on a storage device associated with a motor vehicle comprising: a central unit including: a display configured to display information and configured to be visible within a portion of the passenger compartment, an input device, a storage device, and a wireless antenna port configured to communicate with a wireless antenna; where the wireless antenna is configured to communicate with a wireless network; an application associated with a computer; and where the application transfers a music file from the computer to the motor vehicle using the wireless network, and where the music file is stored on the storage device associated with the motor vehicle.

In another aspect, the application includes a file transfer function.

In another aspect, the application includes a graphical user interface including a first listing portion and a second listing portion.

In another aspect, the application includes an interface program that permits a directory viewing program to recognize the storage device associated with the motor vehicle as a virtual hard disk drive.

In another aspect, the invention provides a motor vehicle comprising: a central unit including a display configured to display information and configured to be visible within a portion of the passenger compartment; the central unit in communication with a storage device; the central unit receiving an instruction via a first wireless port; and the central unit processing the instruction and making a change to a data structure on the storage device.

In another aspect, the change in the data structure on the storage device is the addition of a file.

In another aspect, the change in the data structure on the storage device is the deletion of a file.

In another aspect, the change in the data structure on the storage device includes moving a file from a first directory to a second directory.

In another aspect, the change in the data structure on the storage device is the deletion of a file.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENT(S)

Figure 1:
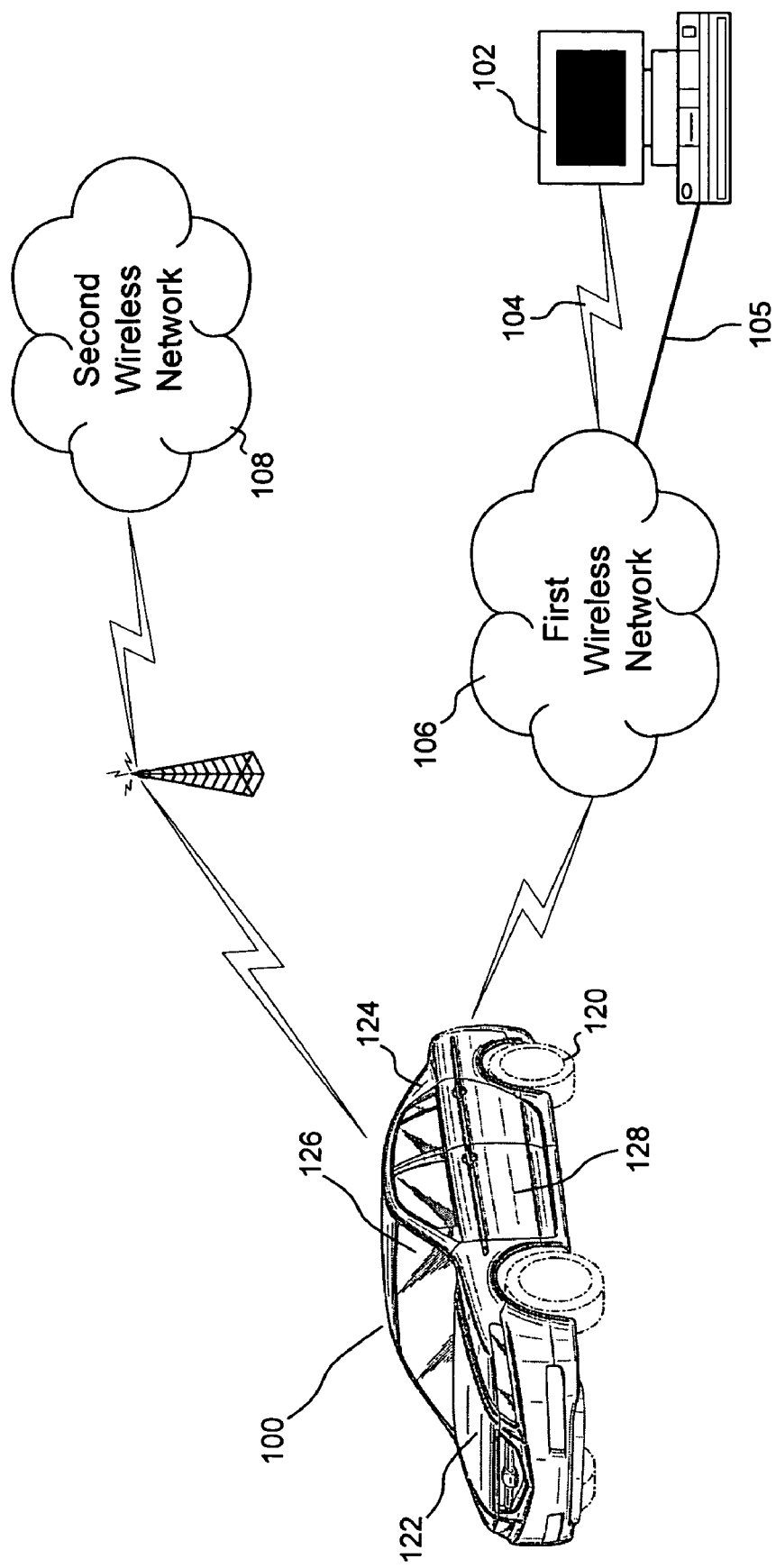
FIG. 1 is a schematic diagram of a preferred embodiment of a vehicle in association with two wireless networks and a computer.

FIG. 1 is a schematic diagram of an illustrative embodiment of motor vehicle 100 along with various communications and computer resources. As shown in FIG. 1, first wireless communications network 106 can communicate wirelessly with motor vehicle 100 and computer 102. First wireless network 106 can be any kind of wireless network, including but not limited to any broadband wireless access network or a high bandwidth packet switched network using, for example, any one of the following standards: IEEE 802.11a, IEEE 802.11b, and/or IEEE 802.11g, commonly referred to as WiFi, IEEE 802.16a, referred to as WiMAX. In the preferred embodiment shown in FIG. 1, first wireless network 106 is a broadband access network that facilitates wireless communications between motor vehicle 100 and computer 102.

Computer 102 can communicate with first wireless network 106 wirelessly 104 or directly 105. In those embodiments where computer 102 communicates with first wireless network 106 wirelessly, computer 102 preferably includes provisions to facilitate wireless communications with first wireless network 106. Some examples of these kinds of provisions include wireless network adapters. In embodiments where computer 102 is directly connected to first wireless network 106, computer 102 is generally directly connected to one or more elements of wireless network 106, for example a switch fabric or a wireless router. In some embodiments, computer 102 can use more than one method of communicating with wireless network 106 with a primary connection mode and use other methods as back-ups. In some embodiments, computer 102 can communicate directly with motor vehicle 100 without the participation of first wireless network 106. In these instances, computer 102 can communicate directly with motor vehicle 100 using an ad hoc mode. Computer 102 can be a portable computer, for example, a laptop, notebook or Personal Data Assistant (PDA) that can be brought close to motor vehicle 100. In some cases, computer 102 can be brought inside motor vehicle 100.

Computer 102 can include a database, generally residing in a mass storage device like a hard disk drive or an optical storage device. The term "computer" refers to the computing resources of a single computer, a portion of the computing resources of a single computer, and/or two or more computers in communication with one another, also any of these resources can be operated by one or more human users. In an exemplary embodiment, computer 102 includes a personal computer.

Second wireless network 108 is preferably different than first wireless network 106 and can be any kind of wireless network, including but not limited to any cellular telephone network using, for example, any one of the following standards: CDMA, TDMA, GSM, AMPS, PCS, analog, and/or W-CDMA. In the embodiment shown in FIG. 1, second wireless network 108 facilitates wireless communications between motor vehicle 100 and other parties who can access second wireless network 108.

Motor vehicle 100 also includes at least one wheel 120 adapted to contact a road surface, an engine 122, a body or chassis 124 and a door 128 that provides access to a passenger compartment 126, which is adapted to accommodate at least one human passenger. In some embodiments, motor vehicle 100 does not include door 128. For example, if motor vehicle 100 were a motorcycle, scooter or personal watercraft, motor vehicle 100 would generally not include door 128.

Figure 2:
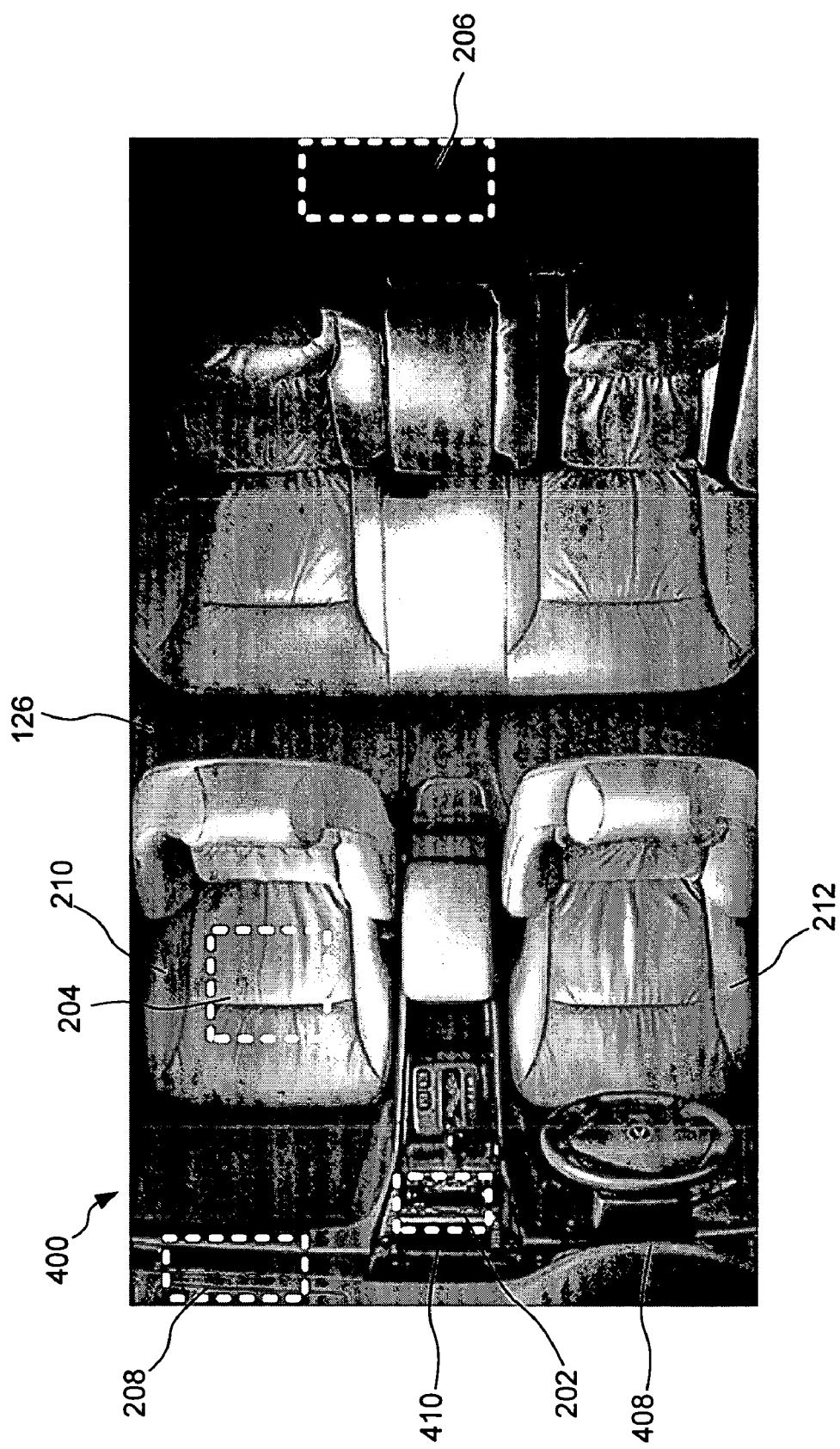
FIG. 2 is a schematic diagram of a preferred embodiment of an interior of a motor vehicle.

FIG. 2 is a schematic diagram of a preferred embodiment of interior 400 of motor vehicle 100. Resources and provisions associated with motor vehicle 100 can be placed in various locations. In some cases, it is desirable that the resources are placed in locations that are generally not immediately visible to occupants in passenger compartment 126. In other situations, it can be desirable to place certain resources and provisions in locations where they are visible to occupants in passenger compartment 126.

Figure 4:
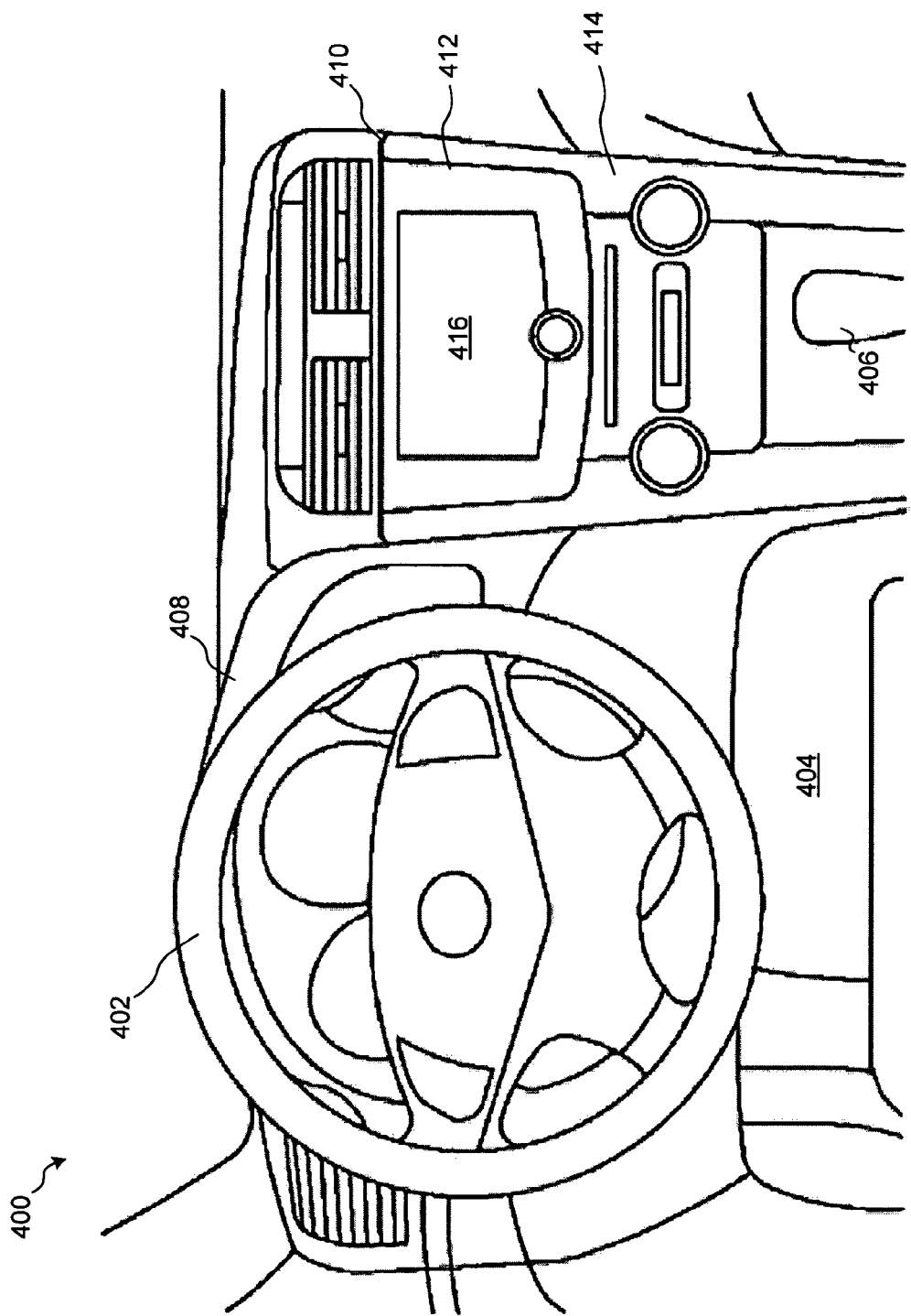
FIG. 4 is a schematic diagram of the interior of the vehicle shown in FIG. 1.

Referring to FIGS. 2 and 4, resources can be placed in a dashboard location 202. This location is generally similar to the placement of a typical head unit. Dashboard location 202 can be near or in dashboard 408 or center console 410. Resources can be placed in a location 204 under seat 210. Although FIG. 2 shows location 204 under passenger seat 210, location 204 can also be placed under driver's seat 212. A trunk location 206 can also be used to accommodate resources. A glove box location 208 near or in glove box 214 can be used to store various resources. These are some of the possible locations where resources can be placed. The locations are shown in dotted lines to indicate that the locations can be inside or underneath the items shown in FIG. 2.

In some embodiments, all of the various resources are located in a single location, while in other embodiments different resources are located in different locations. One or more of the locations can be used. If more than one location is used, the resources can use either a direct communications link or a wireless communications link to communicate with one another. In an exemplary embodiment, Control Area Network (CAN) is used when the various resources are directly connected to one another. Preferably, the Bluetooth protocol is used if the various resources communicate wirelessly. In some embodiments, both direct and wireless communications methods can be used.

Figure 3:
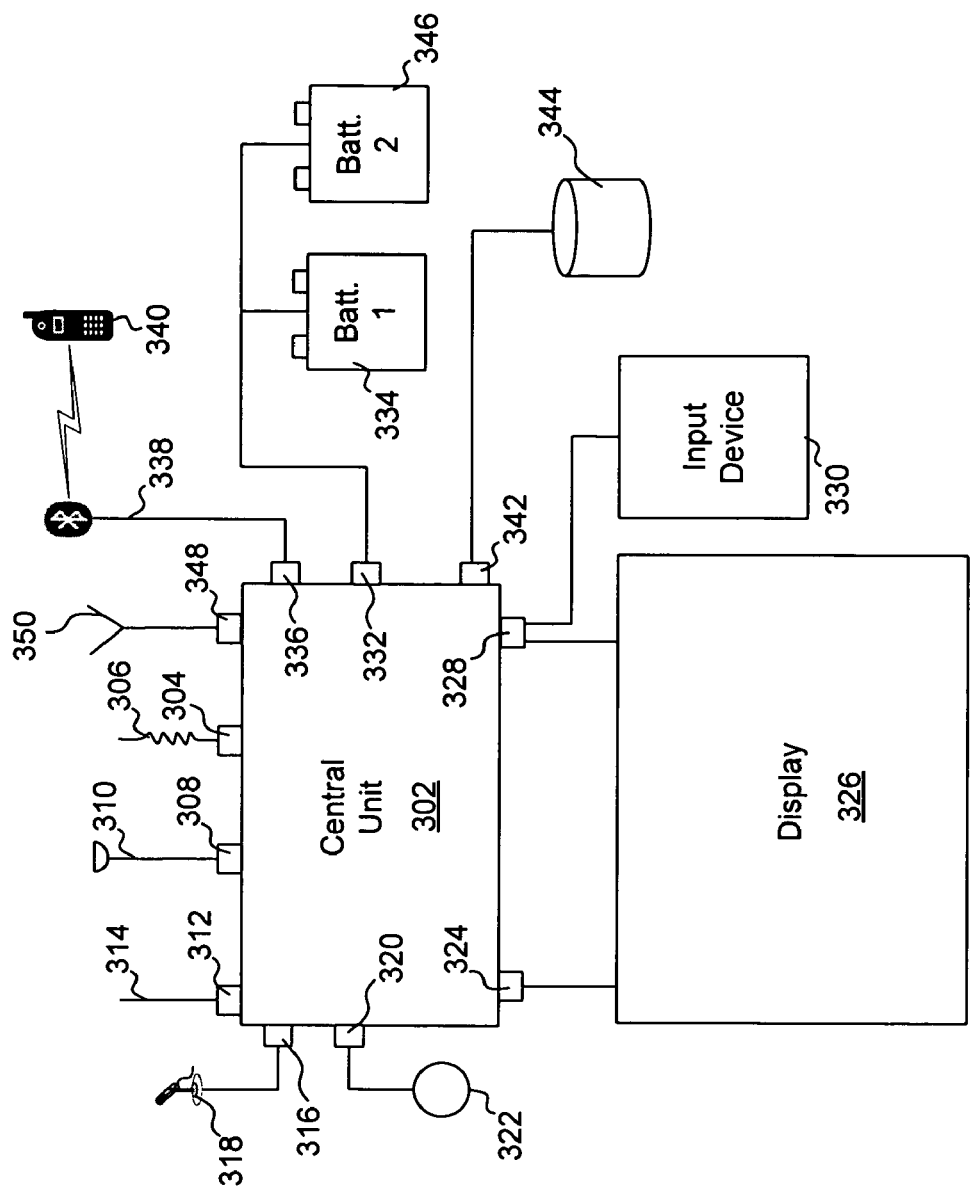
FIG. 3 is a schematic diagram of a preferred embodiment of various resources associated with a motor vehicle.

FIG. 3 is a schematic diagram of several devices, resources and/or provisions that are associated with motor vehicle 100. Central unit 302 can include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with central unit 302 are optional. Some embodiments may include a given port or provision, while others may exclude it. The following description discloses many of the possible parts and provisions that can be used, however, it should be kept in mind that not every part or provision must be used or included in a given embodiment.

Central unit 302 includes a wireless network antenna port 304 that is designed to receive information from a wireless network antenna 306, a GPS antenna port 308 designed to receive information from a GPS antenna 310, a radio antenna port 312 designed to receive information from a radio antenna 314.

Central unit 302 can also include a number of items that facilitate human interaction. To receive vocal information from a user, central unit 302 can include a microphone port 316 that is capable of communicating with a microphone 318. Central unit 302 can also include an audio port 320 that is designed to send audio information to one or more speakers 322 or audio devices. These audio devices can include preamplifiers, amplifiers and/or crossovers. In some embodiments, microphone port 312 and audio port 316 are conductors associated with a single physical connector. For example, microphone port 312 and audio port 316 can be female conductors of a multi-channel coaxial plug, like a standard 2.5 mm headset plug.

In order to provide visual information to a user, central unit 302 can include a display port 324 that is capable of interacting with a display device 326. To receive input from a user, central unit 302 can include an input port 328. Input port 328 can communicate with input device 330. In some embodiments, display device 326 can also receive input from a user. In some embodiments, display device 326 includes a touch screen that can receive input and in other embodiments, display device 326 includes a number of buttons that can receive input. In some embodiments, display device 326 includes both a touch screen and buttons. As shown in FIG. 3, user input received by display device 326 can also communicate with input port 328.

A power port 332 can connect central unit 302 to a power supply 334. In the embodiment shown in FIG. 3, first power supply 334 can be a typical car battery. Optionally, a second battery 346 can be provided. This second battery 346 can be a rechargeable battery associated with central unit 302 and can be used to provide power to central unit 302 and other components when motor vehicle 100 is not running. In a preferred embodiment, second battery 346 is similar to a laptop computer battery. Preferably, second battery 346 is recharged when motor vehicle 100 is running.

Referring to FIGS. 1 and 3, central unit 302 can include provisions that help to facilitate communications with first wireless network 106. As shown in FIG. 3, central unit 302 can include a first wireless network antenna port 348 that is connected to first wireless network antenna 350. Using these resources, central unit 302 can communicate with first wireless network 106. In a preferred embodiment, first wireless network 106 is a broadband wireless access network and central unit 302 preferably includes provisions to interact with such networks. In the case of a broadband wireless access network, central unit 302 can include hardware and software analogous to a network adapter so that central unit 302 will be recognized by first wireless network 106 and will be able to communicate with first wireless network 106.

In some embodiments, those provisions that facilitate communications with first wireless network 106 can be turned on or off and those provisions can have an operational state that is independent of motor vehicle 100. For example, the network provisions can be turned off when motor vehicle 100 is running and those provisions can be turned on even when motor vehicle 100 is not running.

Central unit 302 can also include provisions to communicate with a wireless telephone. Any system can be used to facilitate this communication with a wireless telephone; however, a low power radio frequency system is preferred. In an exemplary embodiment, a wireless local or personal area network using the Bluetooth protocol is used to facilitate communication with a wireless telephone. In the exemplary embodiment shown in FIG. 3, central unit 302 includes a local wireless network antenna port 336 that is designed to communicate with a local wireless network antenna 338, which in turn, is designed to communicate wirelessly with wireless telephone 340.

Referring to FIGS. 1 and 3, there are two ways in which central unit 302 can communicate with second wireless network 108. In some embodiments, central unit 302 includes provisions that permit central unit 302 to act as a wireless telephone. In these embodiments, central unit 302 communicates directly with second wireless network 108 and can use wireless network antenna port 304 and wireless network antenna 306 to assist with this communication. In other embodiments, central unit 302 communicates with wireless telephone 340, which in turn, communicates with second wireless network 108. In these other embodiments, central unit 302 can use local wireless antenna port 336 and associated local wireless network antenna 338 to assist in facilitating communications with wireless telephone 340. One or both of these methods can be used by central unit 302 to communicate with second wireless network 108.

Central unit 302 can also include memory, data storage provisions including one or more databases. Preferably central unit 302 is in communication with at least one storage device 344. Storage device 344 can be any kind of storage device, including but not limited magnetic, optical, magneto-optical, and/or memory, including volatile memory and non-volatile memory. In some embodiments, storage device 344 is integral with central unit 302 and in other embodiments, storage device 344 is separate from central unit 302 and communicates with central unit 302. In some embodiments, storage device 344 is also used to store navigation information.

Central unit 302 can include provisions to decode and playback music in a variety of different formats and using different protocols. For example, central unit 302 can receive digital information from a conventional compact disk, decode this information and prepare an analog signal suitable for output to audio port 320 or to a preamplifier. In some embodiments, central unit 302 can also include decoders that are capable of decoding compressed music files including formats like MP3, AAC, WAV, WMA, ALTRAC, OGG or any other desired file format. Central unit 302 can also include decoders that are capable of decoding uncompressed audio files. Central unit 320 can also include decoders that are capable of decoding high quality audio, for example, DVD-Audio or Super Audio CD (SACD).

In some embodiments, all or most of the items shown in FIG. 3 are housed in a single case or unit. In other embodiments, the various items shown in FIG. 3 are not housed at a single physical location, but instead, are distributed throughout motor vehicle 100 and communicate with one another via known wired or wireless methods. These various locations are shown in FIG. 2.

FIG. 4 is a preferred embodiment of an interior 400 of passenger compartment 126 of motor vehicle 100 (see FIG. 1). Interior 400 includes steering wheel 402, driver's seat 404, shifter or gear selector 406, dashboard 408 and center console 410. Center console 410 includes an upper portion 412 and a lower portion 414. In some embodiments, lower portion 414 includes radio and/or audio controls. Preferably, upper portion 412 includes display 416. In some embodiments, upper portion 412 includes a multi-function unit that can communicate with or control an audio system, a climate control system and/or a navigation system.

In an exemplary embodiment, display 416 is used as display device 326, shown schematically in FIG. 3. Also in the exemplary embodiment, central unit 302 or portions of central unit 302 is disposed behind display 416. In some embodiments, display 416 can include a touch screen and in some embodiments, buttons can be disposed next to display 416.

In one embodiment, central unit 302 includes provisions that allow central unit 302 to act as a hands free telephone system. In this regard, microphone 318 can be placed in a discreet and somewhat hidden location in passenger compartment 126 (see FIG. 1) of motor vehicle 100 (see FIG. 1). Other components are preferably placed out of plain sight.

Figure 5:
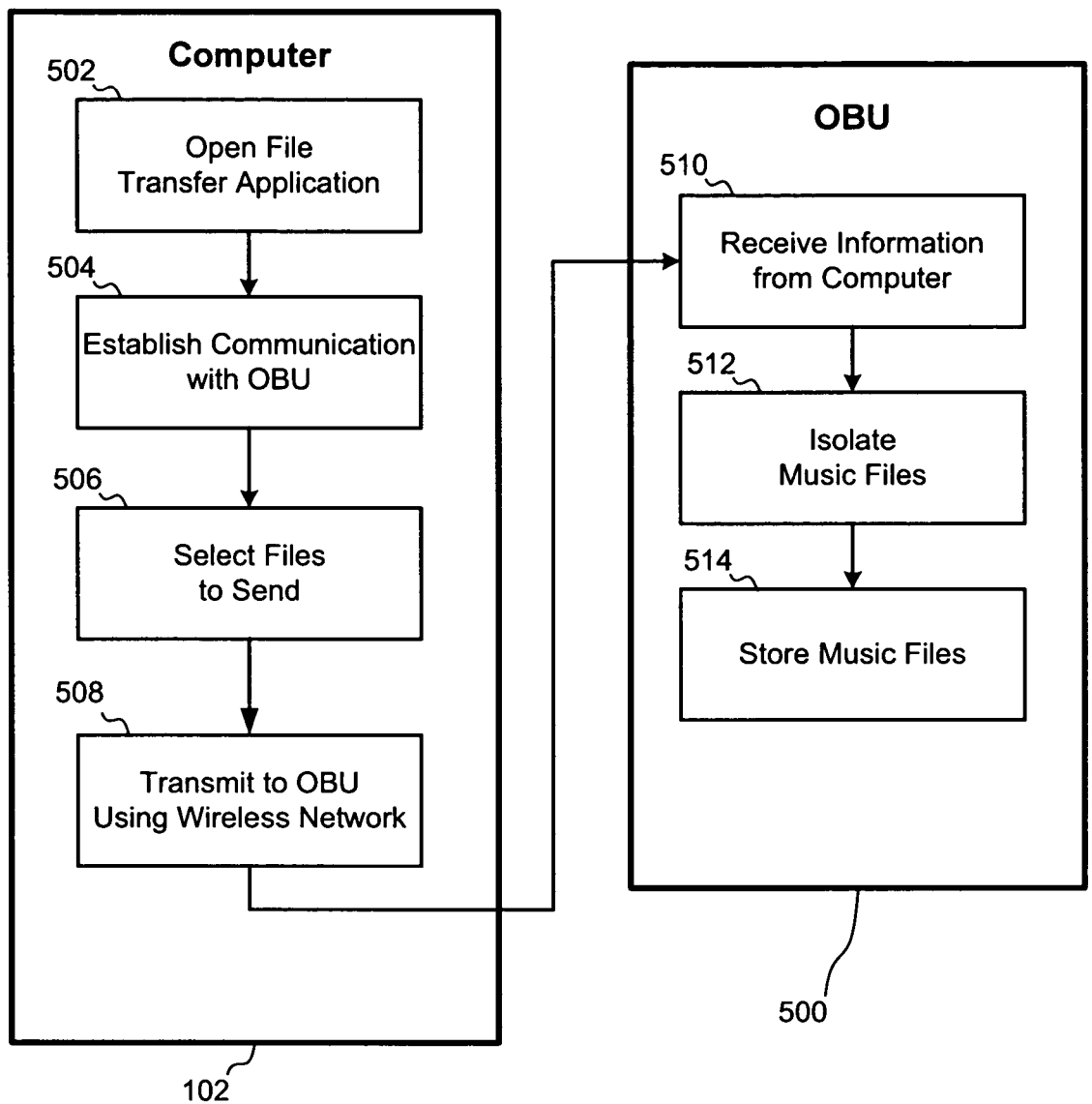
FIG. 5 is a flow diagram of a preferred embodiment of a method for transferring information from a computer to a motor vehicle.

FIG. 5 is a flow diagram of a preferred embodiment of a system and method for sending music files from computer 102 to On Board Unit (referred to as "OBU") 500. Preferably, a system and method to send music files wirelessly from a computer to an OBU 500 associated with motor vehicle 100 is provided.

In the embodiment shown in FIG. 5, certain steps are associated with computer 102 and certain steps are associated with OBU 500. Preferably, those steps associated with OBU 500 are performed on or by OBU 500 and those steps associated with computer 102 are performed on or by computer 102. However, this is not necessarily the case, and those steps associated with OBU 500 can be performed on or by computer 102 or some other resource, and those steps associated with computer 102 can be performed on or by OBU 500 or some other resource. FIG. 5 merely shows a preferred embodiment and the preferred associations of those steps with either computer 102 or OBU 500.

OBU 500 is a device or provision associated with motor vehicle 100. In some embodiments, OBU 500 includes provisions that permit OBU 500 to receive information. In some embodiments, OBU 500 can store information in a memory or computer readable media. In some embodiments, OBU 500 includes provisions that permit OBU 500 to process information. In some embodiments, OBU 500 includes provisions that permit OBU 500 to display information. In some embodiments, OBU 500 includes provisions that permit OBU 500 to receive information from a user. In some embodiments, OBU 500 includes provisions that permit OBU 500 to receive information from a wireless network. In some embodiments, OBU 500 includes provisions that permit OBU 500 to interact with a user. In some embodiments, OBU 500 includes a combination of two or more of the above provisions.

Different embodiments can include different elements or features. For simplicity, the term, "On-Board Unit" (OBU) is used to refer to those elements or components that are associated with motor vehicle 100 (see FIG. 1) for a particular embodiment. In an exemplary embodiment, OBU 500 comprises one or more facilities of central unit 302 (see FIG. 3).

OBU can also include one or more of the items shown in FIG. 3, for example, central unit 302, display 326, and/or input device 330.

The process begins when a user wants to transmit a music file from computer 102 to OBU 500. Preferably, as shown in FIG. 5, the process begins when the user opens a file transfer application in step 502. As disclosed below, there are many different types of file transfer applications that can be used.

In step 504 computer 102 attempts to establish communications with OBU 500. Some embodiments restrict access to OBU 500 and some embodiments can include security provisions. These restrictions help to limit unauthorized access to OBU 500. A preferred embodiment of a method for establishing communications with OBU 500 is disclosed below in connection with FIG. 6.

After communications have been established in step 504, the user can then select files for delivery or transmission to OBU 500. This preferably occurs in step 506. After the files have been selected, those files are then transferred to OBU 500 via a wireless network in step 508. Preferably, first wireless network 106 is used to send files from computer 102 to OBU 500.

Steps 510, 512 and 514 are preferably performed on OBU 500. In step 510, information is received from computer 102. This information can include music files along with other items of information. For example, the information may include headers, addressee and addressor information, transfer protocol information, and other information related to the transferred music file. Preferably, extraneous information is removed and the music files are isolated in step 512. After the music files have been isolated, preferably, those music files are stored on a storage device in step 514.

Figure 6:
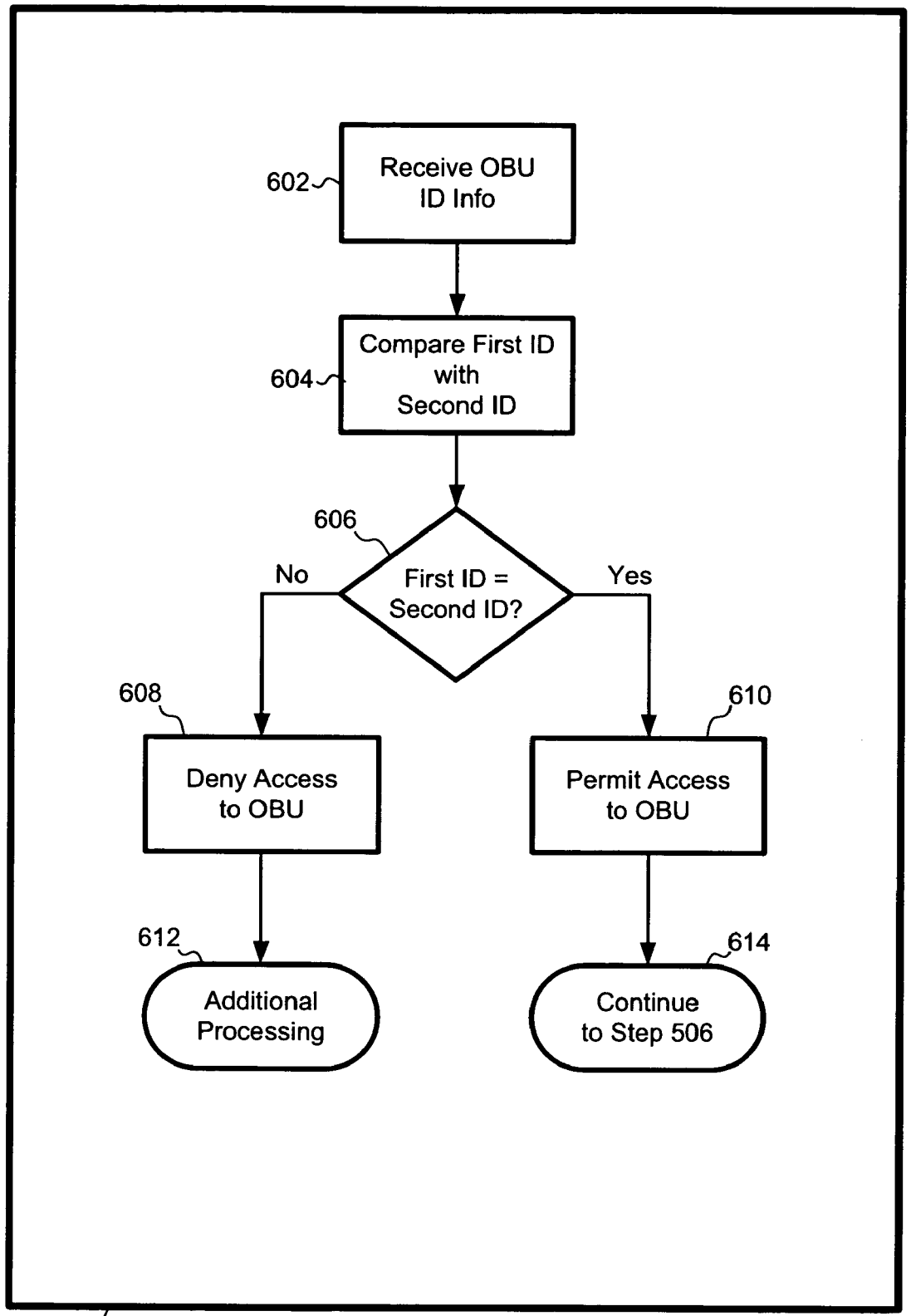
FIG. 6 is a flow diagram of a preferred embodiment of a method for establishing communication with an on board unit.

FIG. 6 is a preferred embodiment of a method for establishing communication 504 with an OBU 500. Preferably, a method is used that includes provisions to limit access to OBU 500. This can be done to enhance the security of OBU 500 and to prevent unauthorized access. This can also be done to prevent the unauthorized duplication of music files from OBU 500 to computers other than an associated computer 102 or an associated user that can provide a password or other access code.

Referring to FIGS. 1, 5 and 6, communication between computer 102 and OBU 500 can be initiated in many different ways. In some embodiments, OBU 500 attempts to initiate communication with first wireless network 106 as soon as it senses first wireless network 106. In this embodiment, OBU 500 attempts to be recognized by first wireless network 106 and make itself available for interaction with other resources communicating with first wireless network 106. In other embodiments, OBU 500 remains inactive until interrogated by first wireless network 106 or until first wireless network 106 initiates communication. In any case, OBU 500 is eventually placed in communication with first wireless network 106.

In step 602, computer 102 receives OBU identifying information from OBU 500. In some embodiments, after communications have been established between computer 102 and OBU 500, identifying information associated with OBU 500 is transferred to computer 102. Identifying information that is associated with OBU 500 is referred to as a first identifier. This first identifier can be sent by OBU 500 or retrieved from OBU 500 by computer 102. Because the process shown in FIG. 6 is associated with computer 102, the term "received" is used in step 602, however, in some embodiments, computer 102 initiates and conducts the retrieval of the first identifier from OBU 500.

In any case, first identifier is preferably unique to OBU 500 and other OBU's associated with other motor vehicles are preferably assigned different identifiers. In some embodiments, first identifier is associated with a Vehicle Identification Number (VIN) associated with motor vehicle 100. The first identifier can be a portion of the VIN or the entire VIN.

After the first identifier is received or retrieved by computer 102 in step 602, the first identifier is compared with a second identifier. This second identifier can be OBU identifying information that is retrieved from a stored location, entered by a user, or pre-programmed on a CD that comes with the motor vehicle.

In step 606 a decision is made. If the first identifier is substantially similar to the second identifier, then access is permitted and computer 102 is allowed to interact with OBU 500. In some embodiments, an exact match between the first identifier and the second identifier is required. In other embodiments, an exact match is not required and, only substantial similarity is required. Substantial similarity can mean that one or several characters, numbers or indicia are different. The preferred embodiment requires an exact match.

In those instances where the first indicia is considered substantially similar, using whichever desired criteria, access to OBU 500 is permitted in step 610. Optionally, a message can be provided in step 610 that informs the user of success in gaining access to OBU 500. The message can also provide information related to the identity of OBU 500. After access to OBU 500 has been permitted, the process continues to step 506, as shown in step 614.

In those instances where first identifier is not substantially similar to the second identifier, access is denied and computer 102 is not permitted to interact with OBU 500. Access is denied in step 608. The process then moves to step 612 where additional processing can occur.

The following additional processing steps can be provided in step 612. In some embodiments, a message indicating that access has been denied to OBU 500 is provided. This message can provide information related to the denial of access and provide additional information to the user including references to an owner's manual or resources available on the Internet.

In some cases, OBU identifying information is a long string of numbers and letters and typographical errors can occur. To allow users to re-enter or re-submit OBU identifying information, step 612 can provide another chance for users to manually enter second identifier. This can be helpful where the user has incorrectly entered known OBU identifying information the first time, or where the second identifier has been incorrectly stored on computer 102 or where the second identifier provided with the CD is erroneous. After this new second identifier is received, the process returns to step 604 from step 612. In step 604, this new second identifier is compared with received OBU identifying information and the process continues.

In some embodiments, both a message and an opportunity to re-enter the second identifier is provided. In some embodiments, the process counts the number of times access has been denied. In these embodiments, if access is denied a predetermined number of times, then access is permanently denied for the present computing session and users are no longer asked to re-enter known OBU identifying information. This predetermined number of failures can be any desired number. In some embodiments, the predetermined number of failures is between 2 and 10. In exemplary embodiments, the predetermined number of failures is about 5.

Figure 7:
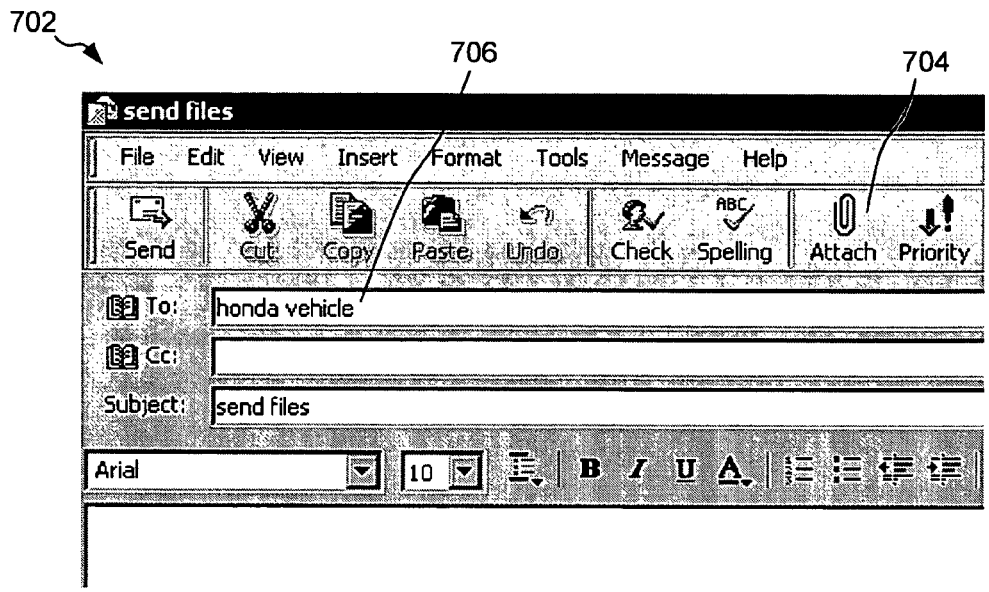
FIG. 7 is a schematic diagram of a graphical user interface of a preferred embodiment of a file transfer application.
Figure 8:
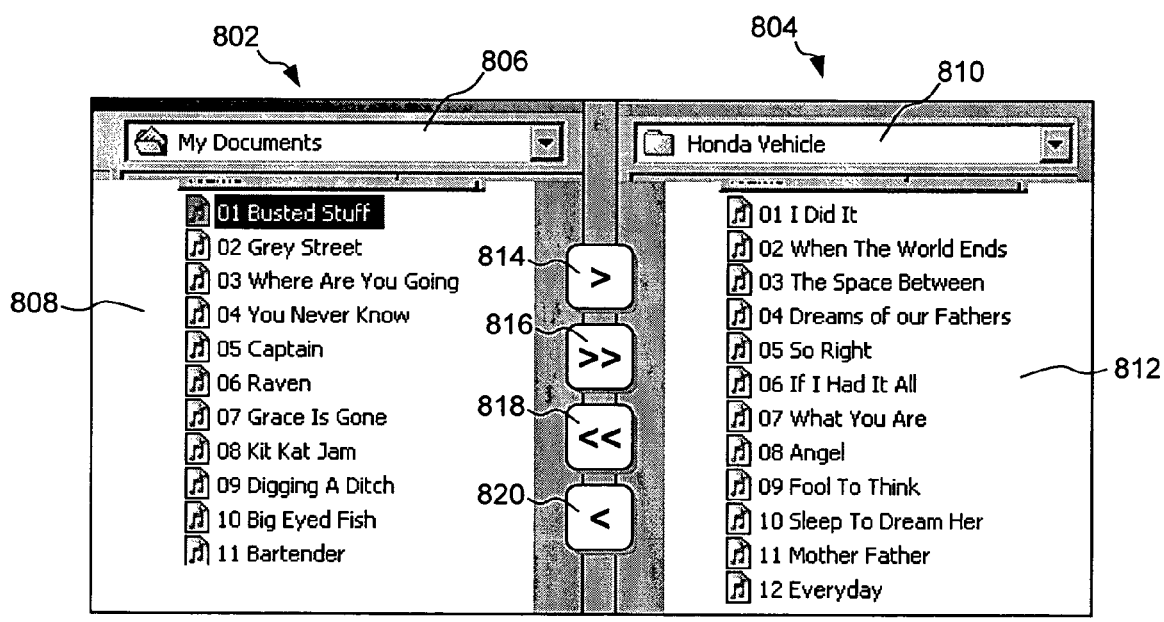
FIG. 8 is a schematic diagram of a graphical user interface of a preferred embodiment of a file transfer application.
Figure 9:
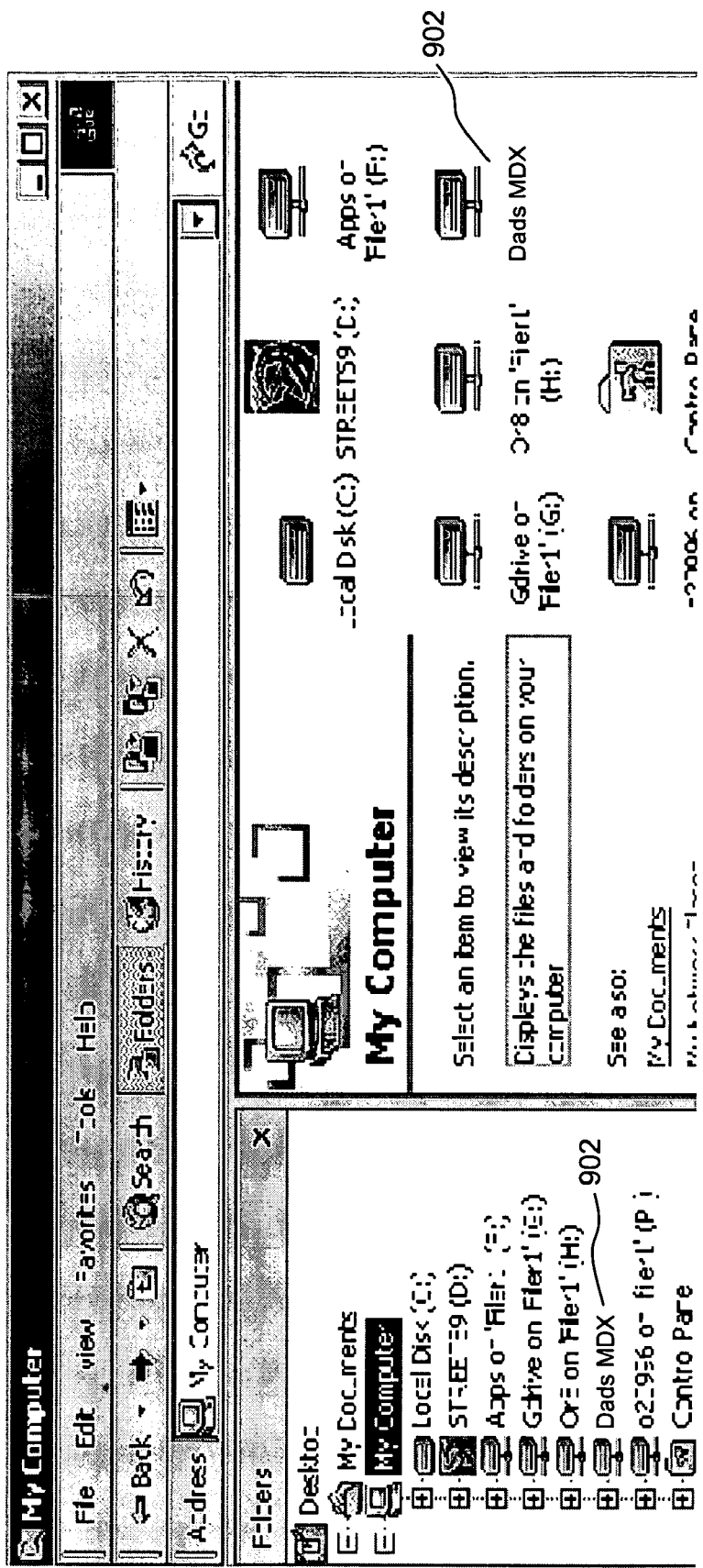
FIG. 9 is a schematic diagram of a graphical user interface of a preferred embodiment of a directory viewer application.

FIGS. 7 to 9 show preferred embodiments of file transfer applications that can be used to transfer music files from computer 102 to OBU 500. Although any application can be used, the following applications are preferred.

FIG. 7 is a schematic diagram of a graphical user interface of a preferred embodiment of a file transfer application 702. File transfer application 702 can be a stand alone application or it can be part of another application, like an Internet browser or some other program that supports File Transfer Protocol (FTP). File transfer application 702 can be used to generate an FTP message.

In the embodiment shown in FIG. 7, files, including music files that are intended to be sent to OBU 500 can be attached to the FTP message. In the embodiment shown in FIG. 7, these attachments can be associated with the FTP message with attach button 704. The "To" field 706 can include nick names or short cut names that represent an actual delivery address. Generally, the actual delivery address is the IP address of OBU 500 on wireless network 106. In the embodiment shown in FIG. 7, the short cut name if OBU 500 is "honda vehicle." After all of the desired files have been attached to FTP message, the FTP message is sent by pressing the send button 706. The FTP message is then sent by computer 102 and delivered to OBU 500.

FIG. 8 is a schematic diagram of another embodiment of a file transfer application. This embodiment includes side by side directories and files. First region 802 associated with computer 102 and a second region 804 associated with OBU 500. First region 802 includes first directory portion 806. Preferably, first directory portion 806 includes a drop down menu and allows the user to search and access directories and files associated with computer 102. First listing portion 808 includes a list of files located within the directory selected in first directory portion 806.

Similarly, second portion 804 includes second directory portion 810 also preferably includes a drop down menu and allows the user to browse the contents of OBU 500. In a preferred embodiment, second directory portion 810 can also browse the contents of any storage device 344 (see FIG. 3) associated with OBU 500. Second portion 804 also includes second listing portion 812 that provides a listing of the files located in the directory selected in second directory portion 810.

This application can be used to transfer files from computer 102 to OBU 500 and vise versa. Preferably, buttons are provided that instruct this application to transfer files. In the embodiment shown in FIG. 8, first transfer button 814 preferably includes a directional arrow pointing to the right and is used to transfer selected files from first listing portion 808 to second listing portion 812.

In an example shown in FIG. 8, song 1, entitled: "Busted Stuff" has been selected. Pressing first transfer button 814 will move the song or a copy of the song from first listing portion 808 to second listing portion 812. This also causes the application to transfer the "Busted Stuff" song file from computer 102 to OBU 500.

First bulk transfer button 816 preferably includes a pair of directional arrows pointing to the right. This button is used to transfer the entire contents of the directory selected in first directory portion 806. In other words, all of the files contained in the selected directory are transferred from computer 102 to the selected directory in second portion 804.

Second transfer button 820 is used to transfer selected files from second listing portion 812 to first listing portion 808. Second bulk transfer button 818 is used to transfer the entire contents of second listing portion 812 to first listing portion 808.

In some embodiments, second transfer button 820 and second bulk transfer button 818 are disabled or are not provided. In these embodiments, files cannot be transferred from OBU 500 to computer 102. This can be done to limit or prevent the unauthorized copying of music files stored on OBU 500. Although songs and files cannot be transferred, songs and files can still be deleted from OBU 500.

FIG. 9 is a schematic diagram of an embodiment of a display of a directory viewer program. Some examples of directory viewer programs include File Manager and Windows Explorer. In this embodiment, a driver or other interface program causes any storage device associated with OBU to be recognized as a virtual hard disk drive by a directory viewer program.

In the embodiment shown in FIG. 9, Windows Explorer has recognized a storage device associated with OBU 500 as hard disk drive 902. In the embodiment shown in FIG. 9, the storage device associated with OBU 500 has a nick name or short cut name of "Dads MDX." Once the directory viewer program recognizes the storage device associated with OBU 500, the user can transfer files, change, create or modify the directory structure of the storage device associated with OBU 500.

Figure 10:
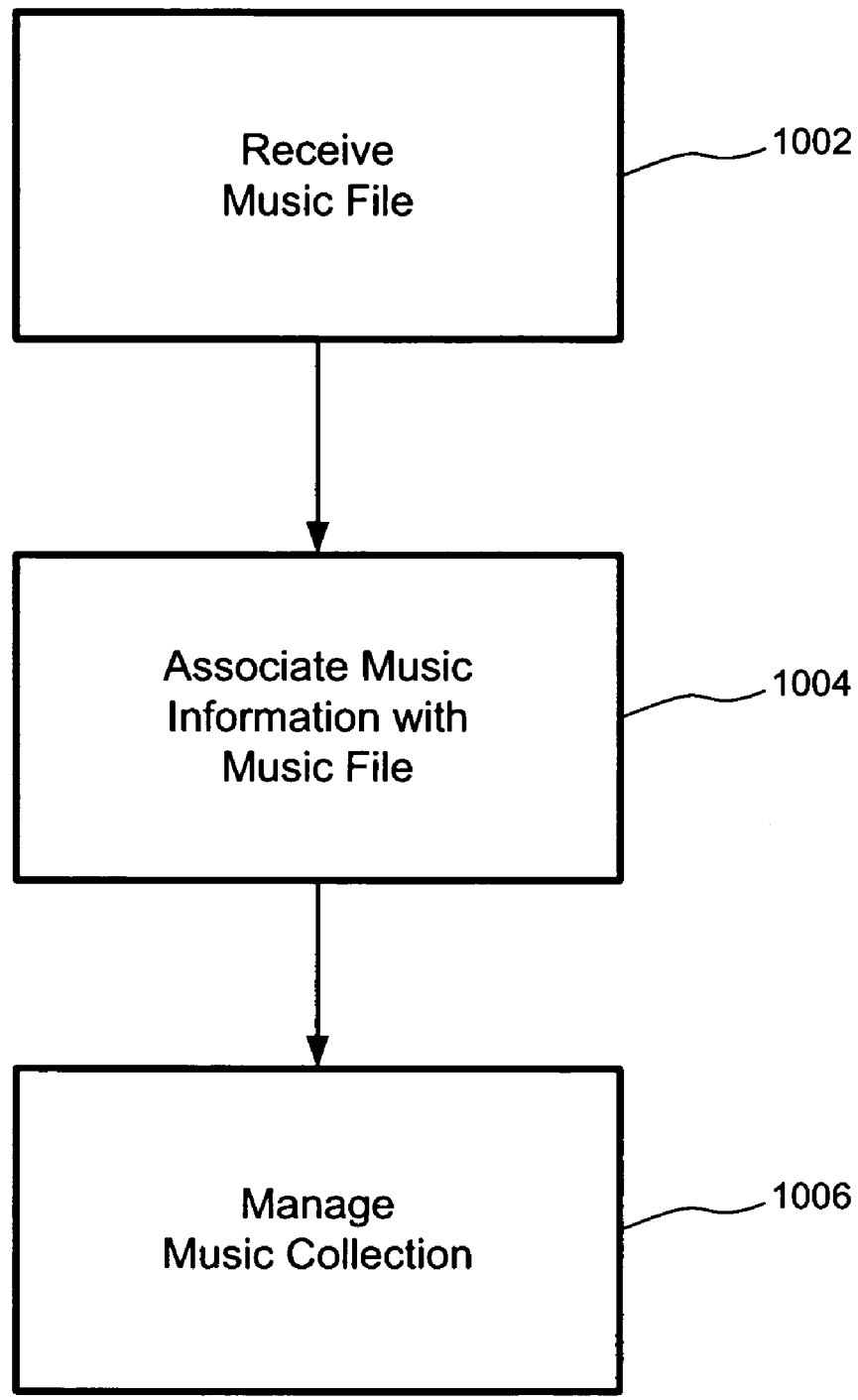
FIG. 10 is a flow diagram of a preferred embodiment of an overall process for associating music information with a corresponding music file and managing an on board music collection.

Some embodiments include additional provisions and features. Some embodiments include provisions to associate music information with music files. This process is also known as tagging, and the music information associated with the music file is sometimes referred to as a tag. Some embodiments include provisions to manage an on board music collection. FIG. 10 is a flow diagram of a preferred embodiment of an overall process for associating music information with a corresponding music file and managing an on board music collection.

Referring to FIG. 10, which provides a general overview, the process starts when music files are loaded or transferred into storage device 344 (see FIG. 3) in step 1002. There are many different ways music files can be transferred to storage device 344. These different methods are disclosed in connection with FIG. 11, discussed below.

After the music file has been received my motor vehicle 100 (see FIG. 1), music information is then associated with the music file. This music information can include bibliographic information, for example, albums can include the following fields: album title, album artist, record label, year, genre, credits, compilation, number/total set of a series or box set, language, geographic region of release, certifier, related URLs, ISRC (International Standard Recording Code number for the CD), and notes.

Individual tracks can include the following track fields: track title, track artist, record label, year, beats per minute, notes, credits, credit name, credit role, credit notes, genres, metagenres, subgenres, and segments (generally used with classical pieces to locate certain portions, which can cross track boundaries or be within a track).

Music information can also be in the form of a tag and the process for associating music information with a particular music file is sometimes referred to as tagging. Additional details of this process for associating music information with music files are disclosed below.

After music information has been associated with the music file, the on board music collection associated with motor vehicle 100 can then be managed.

Figure 11:
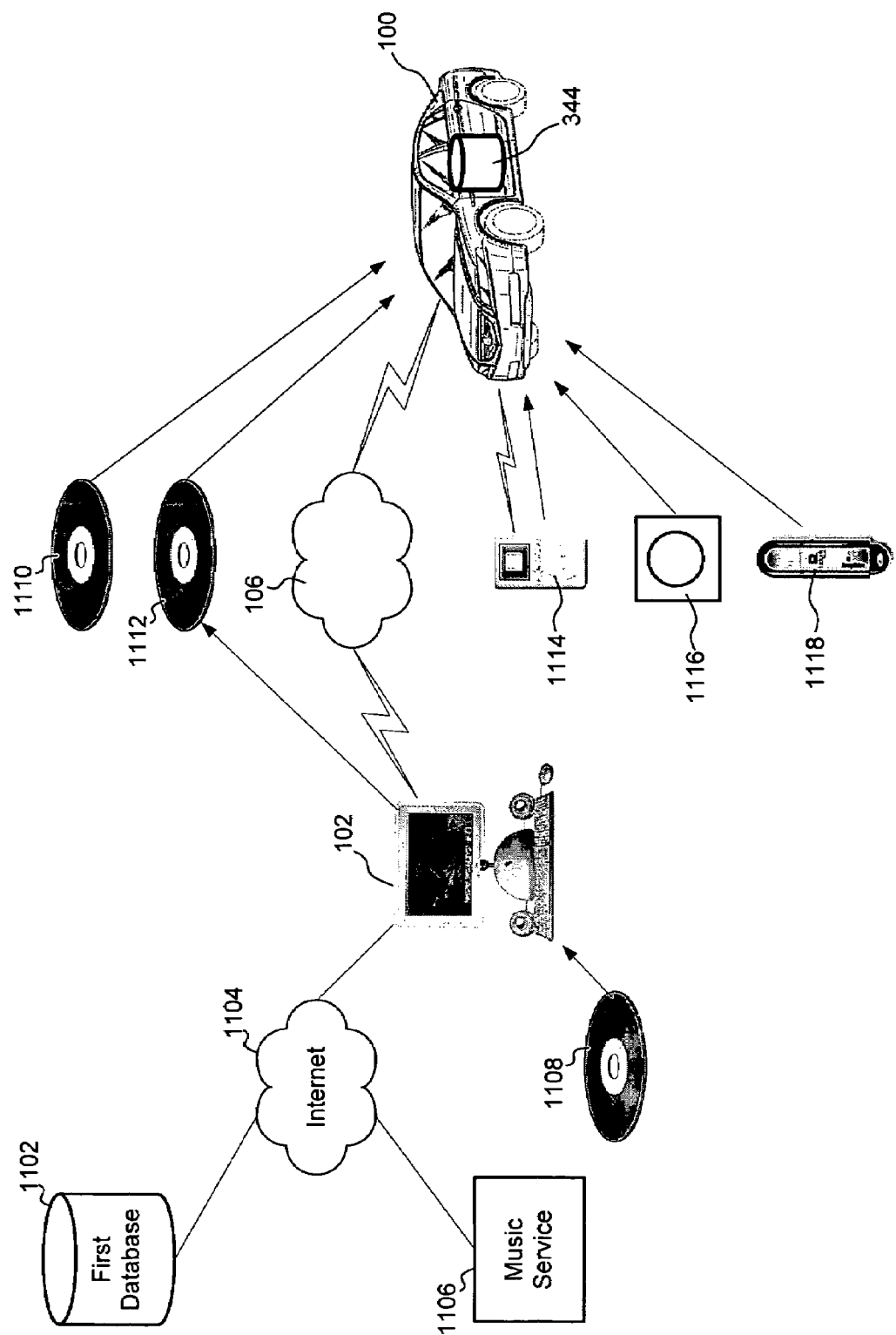
FIG. 11 is a schematic diagram of a preferred embodiment of various resources involved in transferring music information and music files.

Returning to step 1002, additional details of a process for receiving music files can be seen in FIG. 11, which is a schematic diagram of various resources involved in transferring music information and music files. First database 1102 includes music information. In some embodiments, first database 1102 includes a comprehensive collection of music information. In an exemplary embodiment, first database 1102 is the Gracenote CDDB database.

Computer 102 can communicate with first database 1102 through the Internet 1104. Computer 102 can also communicate with music service 1106. Music service 1106 can provide access to music files and computer 102 can download music files from music service 1106. A single music service 1106 is shown for clarity and simplicity; clearly, computer 102 can communicate with other music services as well as music service 1106.

In some embodiments, computer 102 can play audio disk 1108, which can be a Compact Disk (CD), a DVD that includes DVD-Audio, or a Super Audio (SA) CD. Tracks from CD 1108 can be converted into compressed files, a process sometimes referred to as "ripping," and those compressed filed can be stored on computer 102 or storage device 344 in communication with computer 102. Tracks from CD 1108 can also be stored on computer 102 or storage device 344 in communication with computer 102 as uncompressed files.

There are many different ways to transfer music files to motor vehicle 100. A disk 1110 can be played by motor vehicle 100 and one or more tracks can be ripped by motor vehicle 100 with the resulting compressed music files stored on storage device 344. Disk 1110 can be an audio CD, a DVD that includes DVD-Audio, or a Super Audio (SA) CD. A data CD 1112 that contains music files, either compressed or uncompressed, can be played and its contents copied onto storage device 344. Because data CD can include compressed music files, those files would not need to be ripped, however, in some embodiments, motor vehicle 100 can perform a format conversion where compressed music files of a given format are converted into a different format and then stored on storage device 344 in that new format. The file format selected for storage can be a compressed file format or an uncompressed file format.

Music files can be sent by computer 102 to motor vehicle 100 using wireless network 106, as disclosed above. In some embodiments, motor vehicle 100 can include provisions for receiving music files that are stored on a device. Some examples of devices that can be used to transfer music files to motor vehicle 100 include an MP3 player 1114, a removable mass storage device 1116, like a hard disk drive, for example, and a flash memory based mass storage device 1118, like a USB flash memory drive, Compact Flash card, Secure digital card, or any other device using flash memory.

In those embodiments where motor vehicle 100 is capable of receiving music files from these devices, provisions to interface with those devices are preferably provided. Examples of these interfaces include an IEEE 1394 Firewire connector and a USB connector. In some embodiments, some of the devices can communicate wirelessly. In some cases, the devices are capable of using a wireless network including, for example, a wireless network employing the Bluetooth protocol. To accommodate this, some embodiments include provisions to communicate with a device wirelessly. In a preferred embodiment, OBU 500 communicates with one or more devices wirelessly using the Bluetooth protocol. In an exemplary embodiment shown in FIG. 11, MP3 player 1114 communicates wirelessly with OBU 500. OBU 500 can communicate with other devices wirelessly using the Bluetooth, or other protocol.

Figure 12:
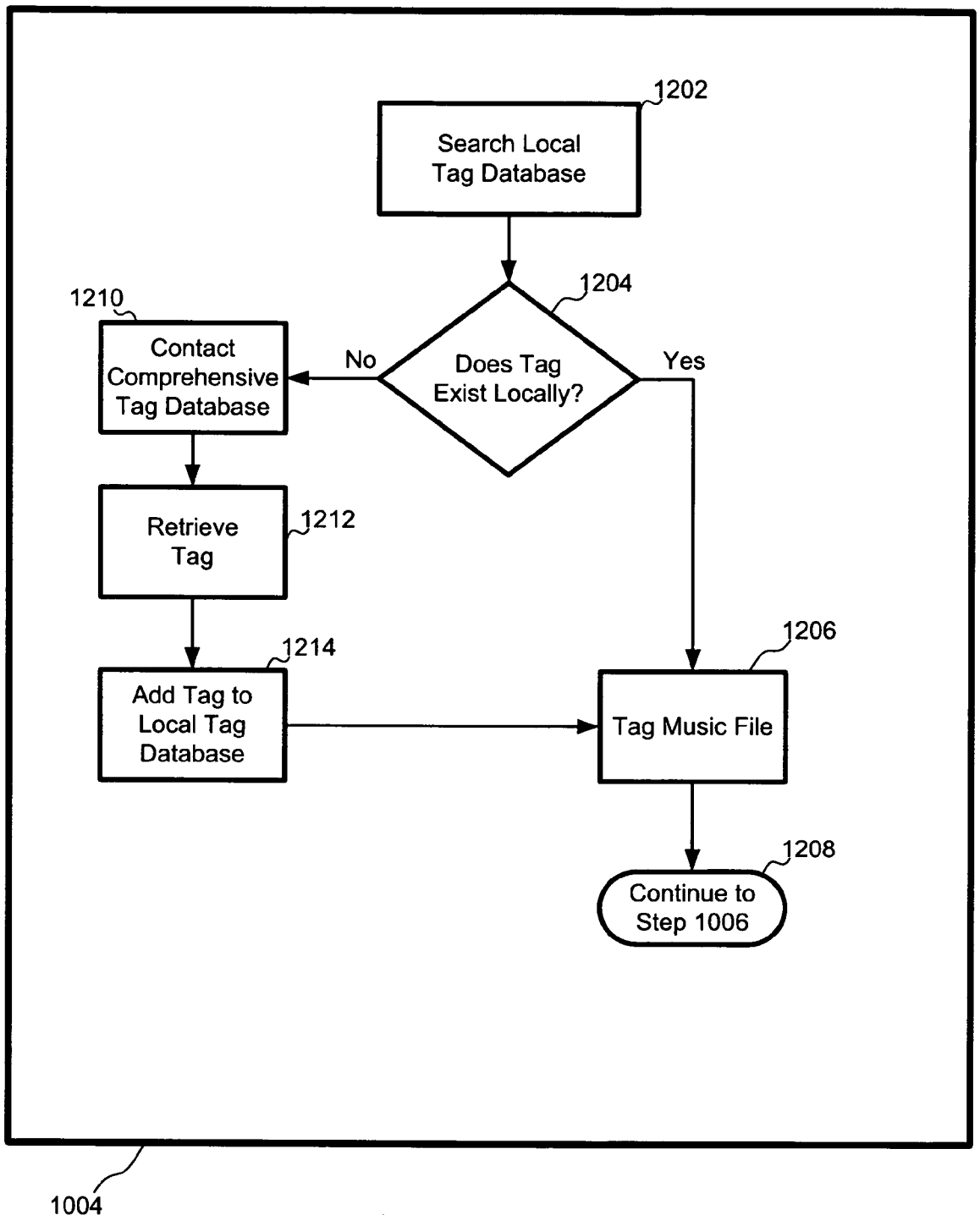
FIG. 12 is a flow diagram of a preferred embodiment of a method for associating music information with a music file.
Figure 16:
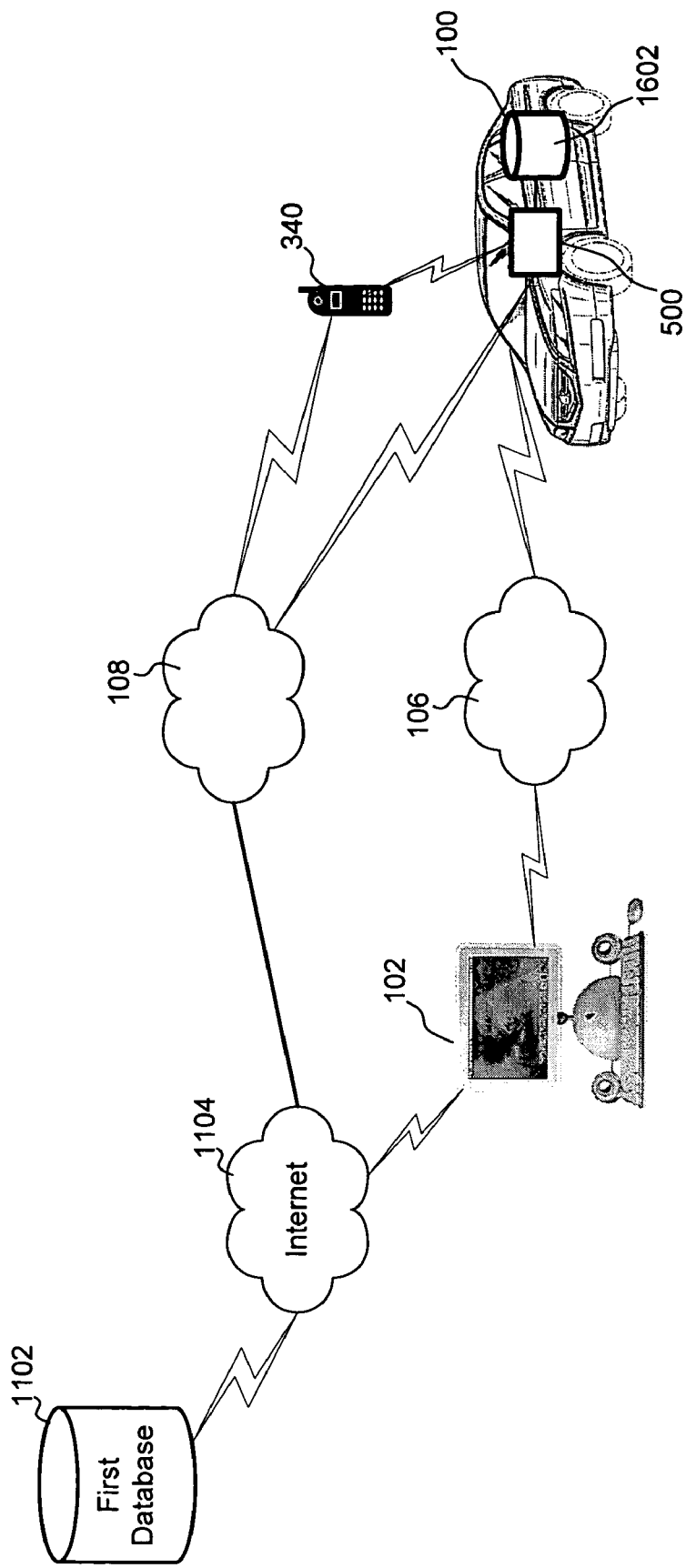
FIG. 16 is a schematic diagram of a preferred embodiment of various resources involved in retrieving music information.

Returning to FIG. 10, after a music file has been transferred to motor vehicle 100, music information is preferably associated with that music file. Referring to FIGS. 10, 12 and 16, which is a schematic diagram of a preferred embodiment of motor vehicle 100 with other resources, motor vehicle 100 includes second database 1602 that includes music information. Preferably, second database is located on motor vehicle 100 and in exemplary embodiments, second database is in communication with OBU 500. Second database 1602 can also be located on storage device 344 (see FIG. 3). In other words, in some embodiments, storage device 344 can include storage space for an on board music collection as well as second database 1602.

Second database is preferably designed to be in convenient and readily accessible communication with OBU 500. Second database 1602 is generally designed to be accessible to OBU 500 at all times, in contrast to first database 1102, which is generally separated from motor vehicle 100 must be reached through the Internet. First database 1102 is generally not directly connected to OBU 500. In a preferred embodiment, second database 1602 is easier for OBU 500 to access, but includes less music information than first database 1102. Because of these attributes, first database 1102 can be referred to as a comprehensive database and second database 1602 can be referred to as a local database.

FIG. 12 is a flow diagram of a preferred embodiment of a method for associating music information with a music file. Referring to FIGS. 10, 12 and 16, the preferred method for associating music information with a music file starts with step 1202 where a search of second database 1602 is conducted. Preferably, second database 1602 is a local database that is accessible to resources associated with motor vehicle 100.

After the search of local tag database has been conducted, the process determines if a suitable tag was located in step 1204. If a suitable tag is found on second database 1602, then the music information is associated with the music file in step 1206. If a suitable tag is not found on second database 1602, then OBU 500 contacts first database 1102 in step 1210 and attempts to retrieve a suitable tag from first database 1102. Additional details regarding the process for contacting comprehensive database 1210 are disclosed below in connection with FIG. 13.

In step 1212, a suitable tag is retrieved and the tag is preferably stored in second database 1602 in step 1214. This step 1214 of storing the tag in second database 1602 is optional and need not be performed. The process then moves onto step 1206 where the tag is associated with the music file. After the tagging has been completed, the process moves onto step 1006 (see FIG. 10).

Figure 13:
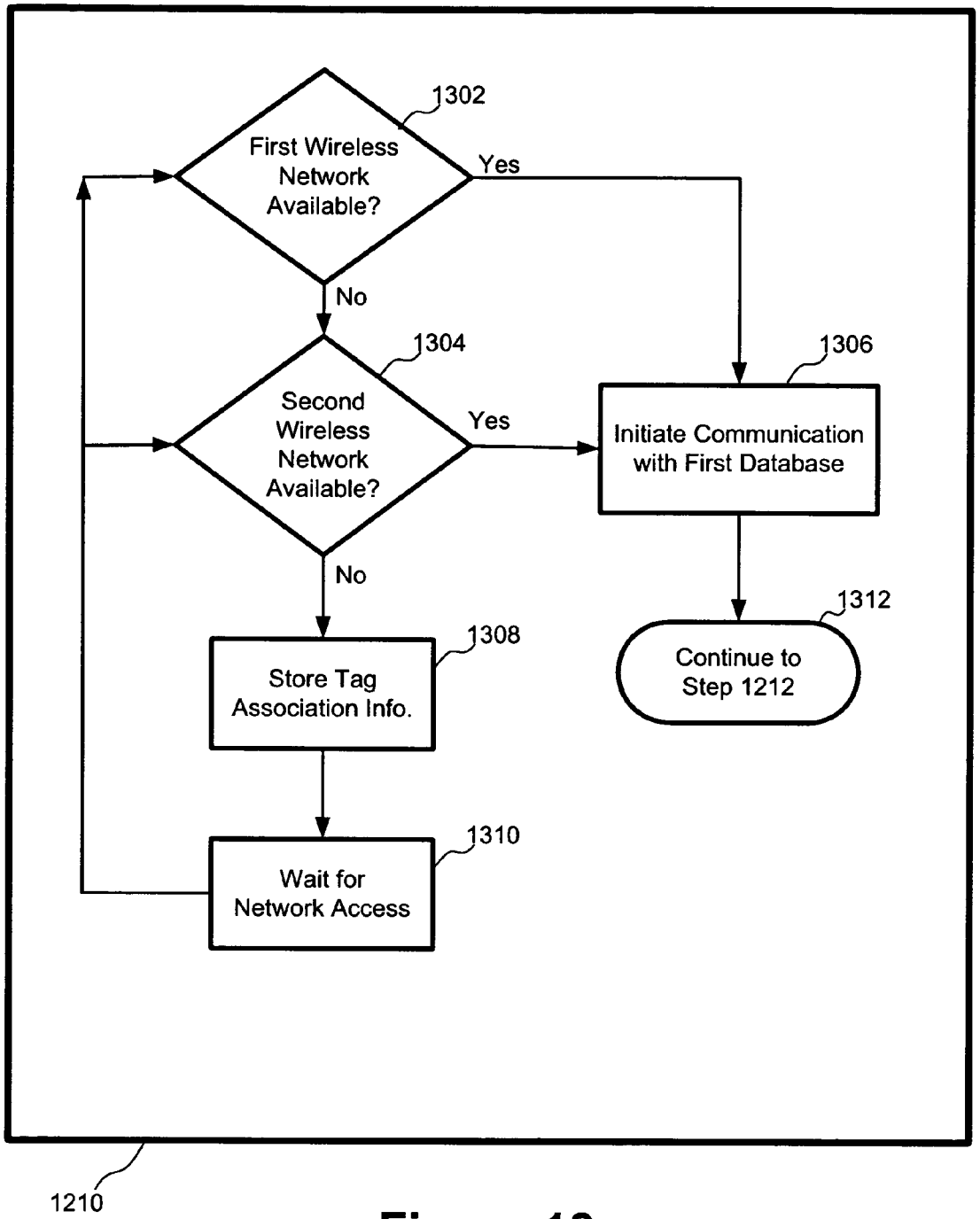
FIG. 13 is a preferred embodiment of a process for contacting first database 1102.

FIG. 13 is a preferred embodiment of a process 1210 for contacting first database 1102. The process begins by determining if first wireless network 106 is available. This occurs in step 1302. Recall that, in preferred embodiments, first wireless network 106 can be a wireless access broadband network. If first wireless network 1302 is available, then OBU 500 initiates communication with first database 1102 using first wireless network 106 and from there the process moves to step 1312 where the process is returned to step 1212, and tag information is retrieved.

If first wireless network 106 is not available, the process can check to see if second wireless network 108 is available in step 1304. This is an optional procedure and not every embodiment will include this step. Also, this step can be disabled so that the system does not investigate the availability of second wireless network 108. There are some instances where it might be desirable to disable step 1304. Preferably, second wireless network 108 is a wireless telephone network. These networks can charge a fee for accessing and using network resources. To avoid paying these fees, step 1304 can be optionally disabled.

If step 1304 is enabled, then the process moves to step 1304 and attempts to initiate contact with first database 1102 using second wireless network 108. As disclosed above, some embodiments of OBU 500 include provisions to communicate with second wireless network 108. In these embodiments, OBU 500 has, in essence, a built-in wireless telephone. In other embodiments, OBU 500 includes provisions to wirelessly communicate with a user's wireless telephone 340. As disclosed above, in an exemplary embodiment, the Bluetooth protocol can be used by OBU 500 to communicate with wireless telephone 340. OBU 500 can attempt to contact first database 1102 using either its own provisions or by communicating with wireless telephone 340. In other words, OBU 500 can attempt to contact first database 1102 directly, using second wireless network 108 or OBU 500 can attempt to contact first database 1102 by first communicating with wireless telephone 340. Either or both of these methods can be employed to contact first database 1102.

If neither of the two wireless networks is available, the process moves to step 1308 where tag association information is stored. Tag association information is that information that is necessary to request the tag from first database 1102. Preferably, tag association information is related to table of contents information from a disk. Tag association information can include portions of the table of contents information or substantially all of the table of contents information.

After the tag association information has been stored, the process can wait for network access in step 1310. In some embodiments, OBU 500 constantly monitors availability to first wireless network 106 and second wireless network 108. In other embodiments, OBU 500 monitors network availability at regular intervals. In other embodiments, OBU 500 only monitors one of the networks for availability. One example of this is when a user has selected only the first wireless network 106 for communication with first database 1102. In other words, the user has disabled or has not granted permission to second wireless network 108 to communicate with first database 1102. In this example, the process in step 1310 would only check for the availability of first wireless network 106.

The process continues to either step 1302 or 1304 depending on which wireless network is available or depending on how the user configured wait step 1310.

Contacting first database 1102 every single time a new music file is received by OBU 500 can be inefficient. In a preferred embodiment, a process is used to predict a user's musical taste and retrieve multiple tags when one of the wireless networks is available. Using this process, second database 1602 is populated with a number of music tags that the user is likely going to need as additional music files are loaded onto OBU 500. By carefully selecting those music tags that the user will likely need, OBU 500 will only need to search second database 1602 as new music files are received and OBU 500 would not need to contact first database as often to retrieve music tags.

Figure 14:
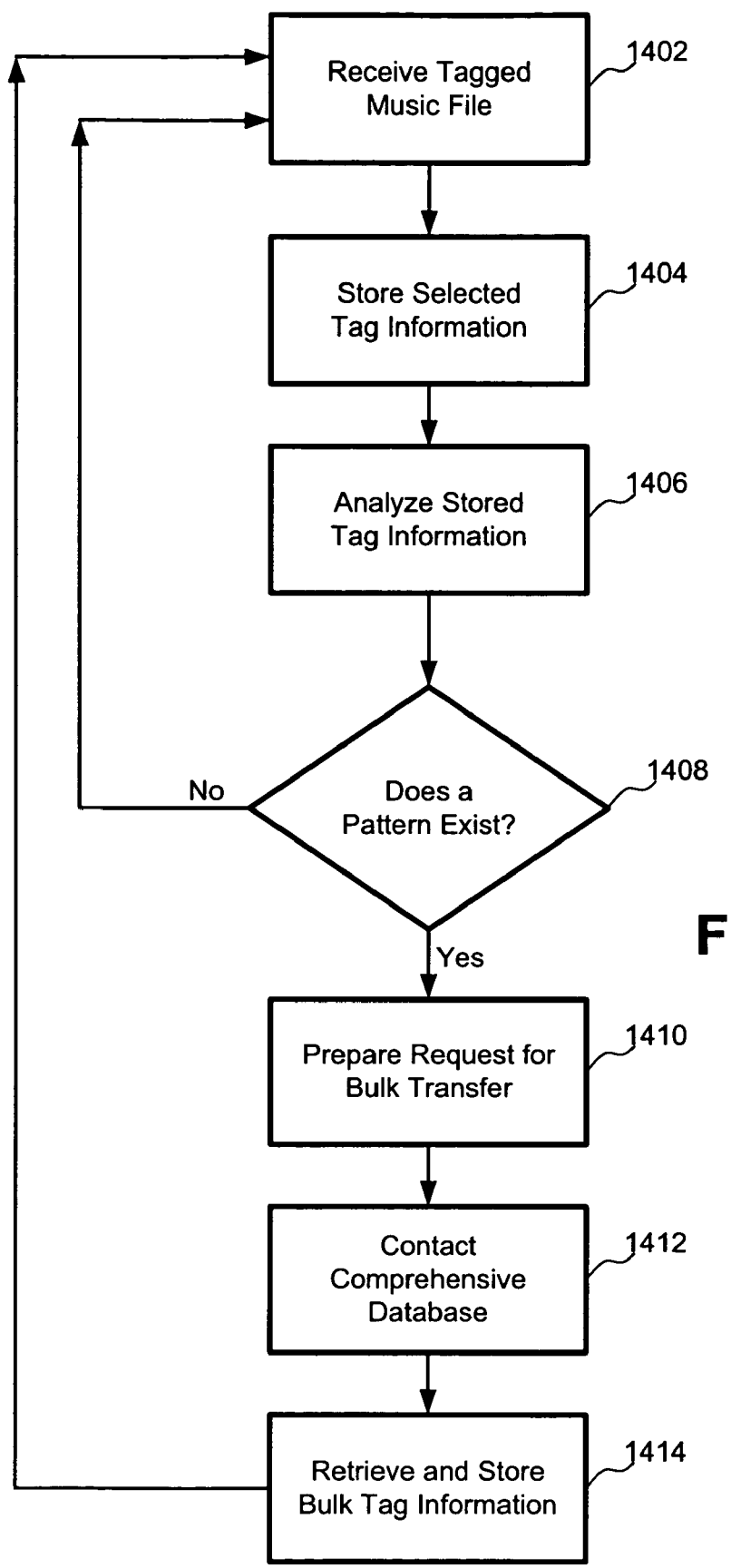
FIG. 14 is a flow diagram of a preferred embodiment of a method for retrieving music information.

FIG. 14 is a flow diagram of a preferred embodiment of a method for retrieving music information. Referring to FIG. 14, the process begins when a tagged music file is received in step 1402. As disclosed above in connection with FIG. 11, music files can be received in many different ways, and as disclosed above in connection with FIGS. 12 and 13, music tags can be retrieved and associated with the music file in many different ways. After the tagged music file has been received, selected tag information is stored. In some embodiments, all available tag information is stored and in other embodiments, less than all of the available tag information is stored.

In step 1406 the stored tag information is analyzed. There are many different ways to analyze the stored tag information. In a preferred embodiment, the goal of the analysis is to try to determine, based on the current stored tag information, which music files the user will likely introduce or transfer to motor vehicle 100. In this preferred embodiment, the system attempts to determine if particular patterns exist in the stored tag information.

In one embodiment, this pattern analysis is based on the number of times a certain item of information is found in the stored tag information. In a preferred embodiment, the artist field of the tag information is stored. If there are N or more of the same artist in the stored tag information, then the system determines that a pattern exists in step 1408. N can be any desired number, but in some embodiments, N=2, so that if two music files by the same artist is found, then the system determines that a pattern exists based on the artist.

In another embodiment, the genre field is analyzed. In this embodiment, if a particular genre occurs more than M times, then a pattern is determined to exist in step 1408. M can be any desired number, however, in preferred embodiments, M is between 2 and 10, and in exemplary embodiments, M=3. In this exemplary embodiment, if there are three or more songs that are from the same genre, then a pattern based on that genre is determined to exist in step 1408.

If no pattern exists, then the process returns to step 1402 where another tagged music file is received. However, if a pattern exists, then the process proceeds to step 1410 and a request for a bulk transfer of tag information is prepared. In step 1410, information related to the patterns that have been determined in step 1406 can be used to prepare the bulk transfer request. In a preferred embodiment, all of the tags associated with a particular pattern are requested. For example, if a pattern involving an artist was discovered in steps 1406 and 1408, then a bulk transfer request for that artist is prepared in step 1410. In a preferred embodiment, all of the tags associated with that artist are requested from first database 1102. Likewise, if a pattern based on genre has been determined in steps 1406 and 1408, then a bulk transfer request based on that genre is prepared in step 1410. In a preferred embodiment, all of the tags associated with that genre are requested in step 1410.

In step 1412, first database is contacted after the bulk transfer request has been prepared in step 1410. In a preferred embodiment, the method disclosed in connection with FIG. 13 is used to contact first database 1102. Preferably, however, due to the potential amount of information, first wireless network 106 is used to conduct a bulk transfer of tag information. In some embodiments, second wireless network 108 can also be used to conduct a bulk transfer of tag information.

After first database 1102 has been conducted, bulk tag information is retrieved and stored on second database 1602 in step 1414. From here, the process returns to step 1402 and the system awaits the receipt of another music file.

In some embodiments, resources associated with motor vehicle 100 can be synchronized with resources associated with computer 102. Preferably, an on-board music collection is synchronized with a corresponding music collection located on computer 102.

Figure 15:
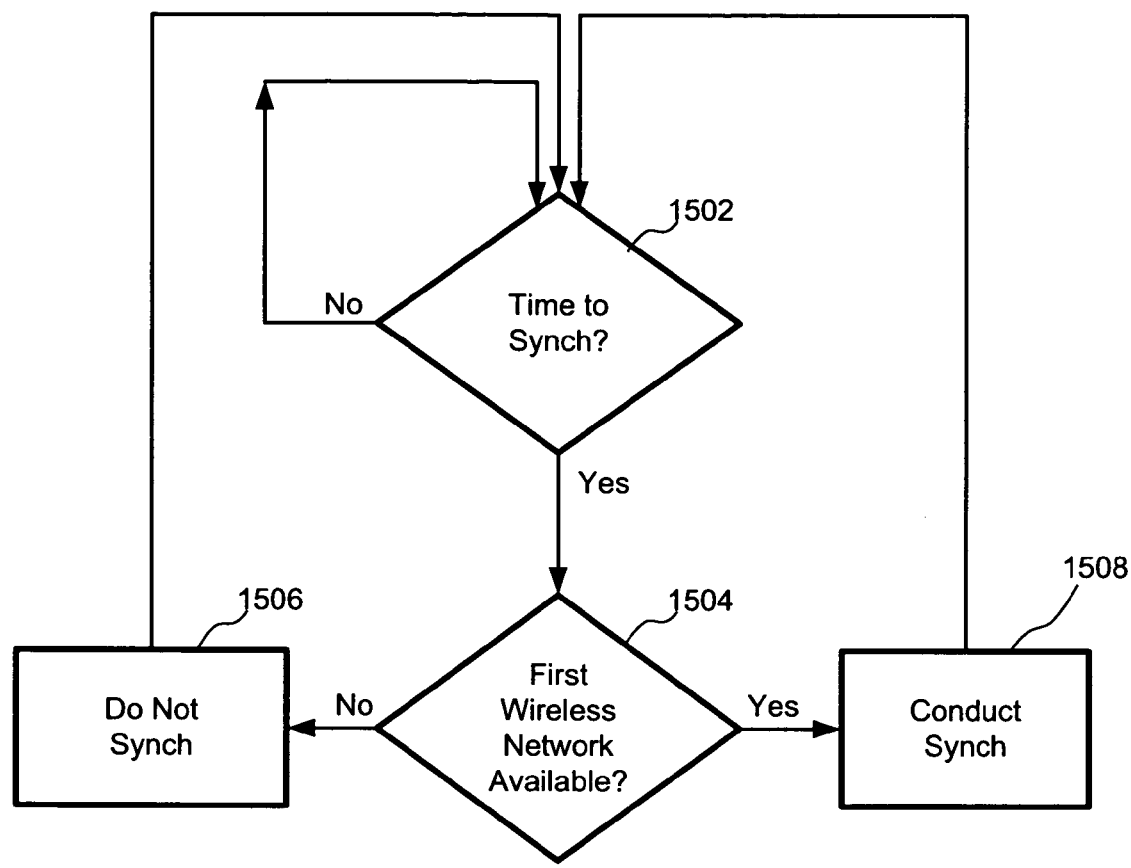
FIG. 15 is a flow diagram of a preferred embodiment of a method for synchronizing an on-board music collection with a corresponding music collection.

FIG. 15 is a flow diagram of a preferred embodiment of a method for synchronizing an on-board music collection with a corresponding music collection. Referring to FIGS. 1 and 15, the process begins with the system determining if it is time to conduct a synching operation in step 1502.

Generally, under normal circumstances, motor vehicle 100 is parked near the user's residence or in the user's garage in the evening and throughout the night. So, motor vehicle 100 is likely to be in close proximity to first wireless network 106 for a period of time. Because of this, users may program their OBU's 500 to perform a synch operation in the middle of the night, for example around 2:00 am. Obviously, users can program their OBU's 500 to conduct the synch operation at any desired time. Generally, users are likely to select a time they believe motor vehicle 100 will be in close proximity to first wireless network 106 and available to conduct the synch for a period of time.

After a synch time has been selected, the process determines if the current time substantially matches the predetermined synch time in step 1502. If the current time does not substantially match the predetermined synch time, then the process waits until this is the case and returns to step 1502. If the current time substantially matches the synch time, then the process determines if first wireless network 106 is available in step 1504. Preferably, because a synch procedure can require a significant amount of data transfer, synch operations are only conducted using first wireless network 106. However, it is possible to conduct a synch operation using second wireless network 108 as well. In those instances where second wireless network 108 is used, second wireless network communicates with computer 102 to perform the synch operation.

If access to first wireless network 106 has been determined in step 1504, then the process conducts a synch operation in step 1508. If first wireless network 106 is not available, then the synch operation is not preformed in step 1506 and the process returns to step 1502, where the process waits for the next opportunity to synch. In either case, if a synch is performed or not, messages can be provided to inform the user of the success, failure and/or status of a synch operation.

Figure 17:
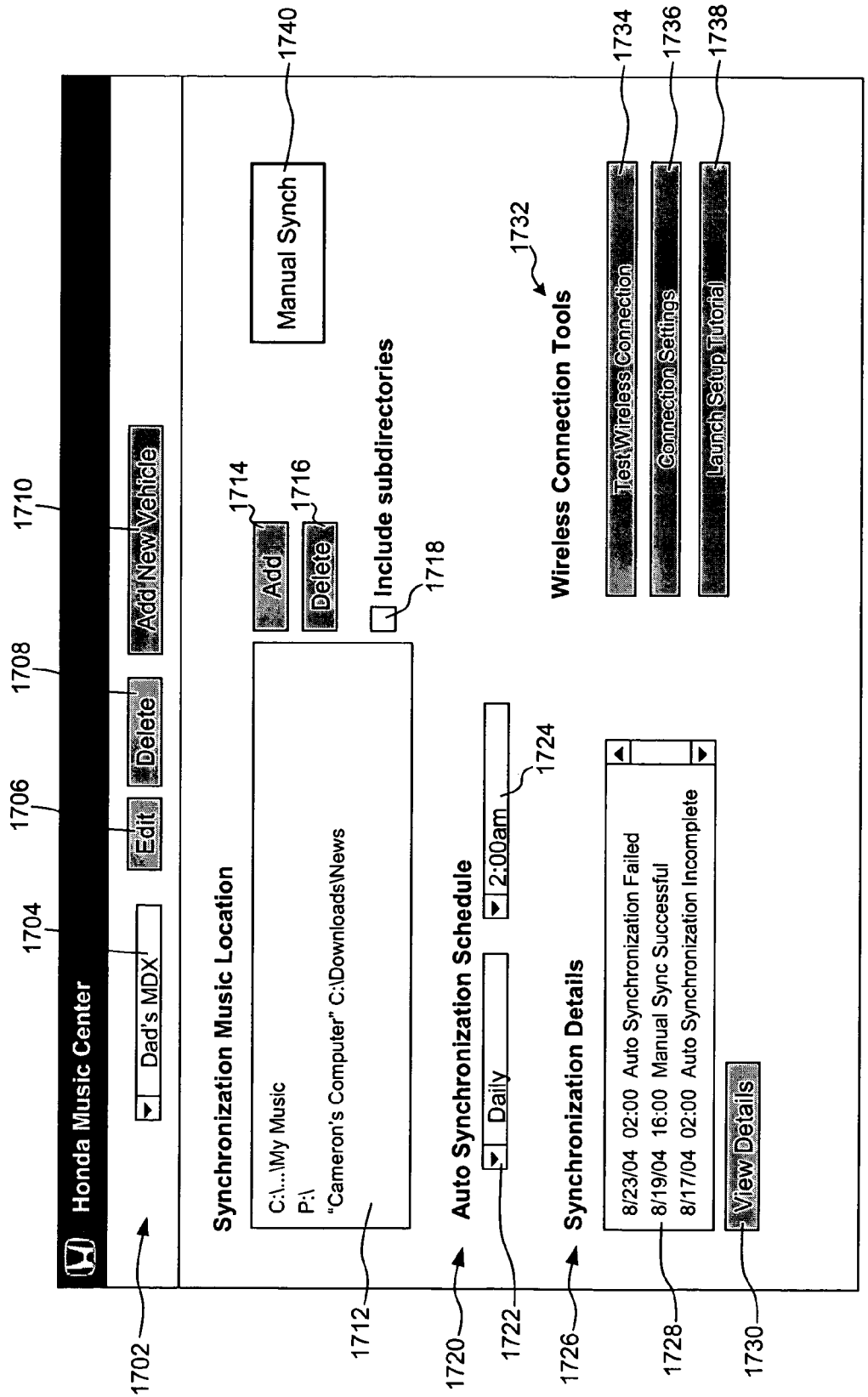
FIG. 17 is a schematic diagram of a preferred embodiment of a user interface of an application that assists in managing an on board music collection.

In some embodiments, an application is provided that helps to manage the on board music collection. In a preferred embodiment, the application is configured to run on computer 102. FIG. 17 is a schematic diagram of a user interface 1702 of a preferred embodiment of an application configured to run on computer 102.

Referring to FIG. 17, the application can, in some embodiments, interact with more than one motor vehicle. In those instances where the application interacts with multiple vehicles, motor vehicle selection menu 1704 is provided. Using this menu, users can select which motor vehicle they wish to manage in this computing session. In the embodiment shown in FIG. 17, the vehicle called: "Dad's MDX" has been selected.

The application can also allow users to change or modify motor vehicle preferences and associations. To assist with this, the application preferably includes an edit button 1706, a delete button 1708 and an add new vehicle button 1710. The edit button 1706 allows users to change the settings and preferences associated with a motor vehicle. Delete button 1708 allows users to remove a motor vehicle from the application, and the add new vehicle button 1710 allows users to configure the application to interact with additional vehicles.

The application preferably includes a synchronization music location portion 1712. In this portion, users can enter directories associated with computer 102 that are to be synchronized with the on board music collection. Preferably, the contents of the directory or directories listed in 1712 are similar to the on board music collection. Thus, any changes made to the directories listed in 1712 are reflected in the on board music collection after a synch operation and likewise, any changes made to the on board music collection are reflected in the directories listed in 1712 after a synch operation. An add button 1714 can be provided that allows users to add additional directories to be synchronized and a second delete button 1716 can be provided that allows users to delete directories that are to be synchronized. A selection box 1718 can be provided that instructs the application to synchronize subdirectories as well as the root directories listed in 1712.

An auto synchronization schedule portion 1720 can be provided. This portion can be used to schedule a synchronization operation. Auto synchronization schedule portion 1720 can include a period or interval portion 1722. This portion is used to select a time interval. Examples of available time intervals include daily, weekly, monthly, bi-monthly, quarterly, annually. Other time intervals can be provided. Period portion 1722 can include a drop down menu so that users can select a desired time interval to conduct the synchronization. Auto synchronization schedule portion 1720 can also include a time portion 1724. Using time portion 1724 users can set a time at which the synchronization operation is to occur. Generally, users can select a time where the motor vehicle will not be used and will be in close proximity to an available wireless network. In the example shown in FIG. 17, 2:00 am has been selected.

The application can also include a synchronization details section 1726. This section can include a summary box 1728 that provides a summary listing of past synchronization operations and/or attempts. A details button 1730 can be provided that, when selected, provides additional details of past synchronization operations and/or attempts. In some embodiments, these additional details appear in a new window.

The application can also include a wireless connection tools section 1732. This section provides tools to assist the user with the wireless connection between computer 102 and motor vehicle 100. This wireless connection tools section 1732 can include a test wireless connection button 1734 that runs a testing sequence; a connection settings button 1736 that provides connection details; and a launch setup tutorial 1738 that launches a tutorial. The tools in this section 1732 can help users understand the setup process and details of their connection. The tools can also recommend adjustments if the connection speed is low. In some cases, these tools will recommend access point adjustments.

The application also include manual synch button 1740. Pressing this button will cause the application to immediately conduct a synchronization operation between computer 102 and motor vehicle 100.

Each of the various components or features disclosed can be used alone or with other components or features. Each of the components or features can be considered discrete and independent building blocks. In some cases, combinations of the components or features can be considered a discrete unit.

While various embodiments of the invention have been described, it will be apparent to those of ordinary skill in the art that may more embodiments and implementations are possible that are within the scope of the invention. Accordingly, the invention is not to be restricted except in light of the attached claims and their equivalents.

What is claimed is:

1. A motor vehicle comprising:
   a central unit including a display configured to display information and configured to be visible within a portion of the passenger compartment, an input device, a storage device, and a wireless antenna port configured to communicate with a wireless antenna;
   wherein the wireless antenna is configured to communicate with a wireless network that is configured to communicate with an external computer;
   wherein the central unit is configured to receive an untagged music file from the wireless antenna port if a first identifier received from the external computer is substantially similar to a second identifier stored on the central unit, wherein the first identifier corresponds to central unit identifying information associated with the central unit, the first identifier including information uniquely associated with the central unit;

wherein the central unit is configured to compare the first identifier with the second identifier stored on the central unit;

wherein the central unit is configured to receive a plurality of music tags from a comprehensive music tagging database linked to the external computer to create a music tagging database on the storage device;

wherein the central unit is configured to store the untagged music file on the storage device; and wherein the central unit is configured to associate a music tag from the music tagging database on the storage device with the untagged music file.

2. The motor vehicle according to claim 1, wherein the wireless antenna is configured to communicate with a broadband wireless access network.

3. The motor vehicle according to claim 1, wherein the central unit can receive an instruction through the wireless antenna.

4. The motor vehicle according to claim 1, wherein the central unit includes provisions to communicate with a second wireless network.

5. The motor vehicle according to claim 4, wherein the provisions include a second wireless antenna port in communication with a second wireless antenna, wherein the second wireless antenna is configured to communicate with the second wireless network.

6. The motor vehicle according to claim 4, wherein the provisions include a local wireless antenna port in communication with a local wireless antenna, wherein the local wireless antenna is configured to communicate with a wireless telephone.

7. The motor vehicle according to claim 1, wherein the untagged music file is a compressed file.

8. The motor vehicle according to claim 1, wherein the untagged music file is an uncompressed file.

9. A method for transferring an untagged music file from a computer to an on-board unit (OBU) associated with a motor vehicle comprising the steps of:

receiving a first identifier from the computer corresponding to OBU identifying information associated with the OBU, the first identifier including information uniquely associated with the OBU;

comparing the first identifier with a second identifier stored on the OBU;

transferring a plurality of music tags from a comprehensive music tagging database linked to the computer to the OBU to create a music tagging database on the OBU;

transferring the untagged music file to the OBU if the first identifier is substantially similar to the second identifier;

storing the untagged music file in a database on the OBU; and associating the untagged music file with a music tag from the music tagging database.

10. The method according to claim 9, wherein access to the OBU is denied if the first identifier is different than the second identifier.

11. The method according to claim 9, wherein the first identifier is related to a Vehicle Identification Number associated with the motor vehicle.

12. The method according to claim 9, wherein the second identifier is received from a user.

13. The method according to claim 9, wherein the method is executed by an application running on a computer.

14. The method according to claim 13, wherein the application is stored on a disk provided to a user and the second identifier is also stored on the disk.

15. The method according to claim 13, wherein the second identifier is retrieved from a memory associated with a computer.

16. The method according to claim 13, wherein a second opportunity to enter the second identifier is provided if a first attempt to enter the second identifier was unsuccessful.

* * * * *